US012591398B2

(12) United States Patent
Miyagishi et al.

(10) Patent No.: US 12,591,398 B2
(45) Date of Patent: Mar. 31, 2026

(54) INK JET SYSTEM

(71) Applicant: SEIKO EPSON CORPORATION, Tokyo (JP)

(72) Inventors: Akira Miyagishi, Shiojiri (JP); Nobuaki Ito, Suwa (JP); Toshiro Murayama, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 18/520,134

(22) Filed: Nov. 27, 2023

(65) Prior Publication Data

US 2024/0173969 A1     May 30, 2024

(30) Foreign Application Priority Data

Nov. 29, 2022     (JP) ................................. 2022-190459

(51) Int. Cl.
| | |
|---|---|
| *B41J 2/165* | (2006.01) |
| *B41J 2/045* | (2006.01) |
| *G06F 3/12* | (2006.01) |
| *H04N 1/60* | (2006.01) |

(52) U.S. Cl.
CPC ........ *G06F 3/1201* (2013.01); *B41J 2/04541* (2013.01); *B41J 2/04553* (2013.01); *B41J 2/04581* (2013.01); *B41J 2/16579* (2013.01); *G06F 3/1293* (2013.01); *H04N 1/60* (2013.01)

(58) Field of Classification Search
CPC ......... B41J 2/165; B41J 2/16579; G06F 3/12; G06F 3/1201; G06F 3/1293; H04N 1/56; H04N 1/60
See application file for complete search history.

(56) References Cited

U.S. PATENT DOCUMENTS

| | | | | |
|---|---|---|---|---|
| 11,467,785 | B1 * | 10/2022 | Praharaj ................ | G06F 3/1285 |
| 2020/0276828 | A1 * | 9/2020 | Watanabe ............ | B41J 2/16526 |
| 2021/0162744 | A1 | 6/2021 | Shimizu | |
| 2021/0256677 | A1 * | 8/2021 | Kobashi ................ | G06V 30/40 |

FOREIGN PATENT DOCUMENTS

| | | |
|---|---|---|
| JP | 2021-084274 A | 6/2021 |
| JP | 2021-084388 A | 6/2021 |

* cited by examiner

*Primary Examiner* — Douglas X Rodriguez
*Assistant Examiner* — Kendrick X Liu
(74) *Attorney, Agent, or Firm* — WORKMAN NYDEGGER

(57) ABSTRACT

An ink jet system includes a recording device on which a head unit that ejects ink is mounted, the recording device performing recording on a recording medium, a processing device connected to the recording device and performing a data process for causing the recording device to perform recording, and a server connectable to either the recording device or the processing device, wherein either the recording device or the processing device includes a receiver that receives a control parameter from the server, a controller that controls an ejection operation for ejecting ink from the head unit based on the control parameter, and a reception unit that receives evaluation information indicating an evaluation result obtained by causing a user to perform evaluation on one or a plurality of evaluation items of the control parameter in N levels of three or more after the ejection operation.

20 Claims, 12 Drawing Sheets

| R | G | B | C | M | Y |
|---|---|---|---|---|---|
| 0 | 0 | 0 | 255 | 255 | 255 |
| ... | ... | ... | ... | ... | ... |
| 0 | 0 | 128 | 128 | 128 | 0 |
| ... | ... | ... | ... | ... | ... |
| 255 | 255 | 255 | 0 | 0 | 0 |

LT2

| R | G | B | C | M | Y |
|---|---|---|---|---|---|
| 0 | 0 | 0 | 255 | 255 | 255 |
| ... | ... | ... | ... | ... | ... |
| 0 | 0 | 128 | 172 | 64 | 0 |
| ... | ... | ... | ... | ... | ... |
| 255 | 255 | 255 | 0 | 0 | 0 |

INK JET SYSTEM

The present application is based on, and claims priority from JP Application Serial Number 2022-190459, filed Nov. 29, 2022, the disclosure of which is hereby incorporated by reference herein in its entirety.

BACKGROUND

1. Technical Field

The present disclosure relates to an ink jet system.

2. Related Art

In the related art, a recording device such as an ink jet printer on which a head unit that ejects ink is mounted and performs an ejection operation on a recording medium such as printing paper is provided. For example, JP-A-2021-84388 discloses a recording device that applies a waveform of a drive signal to a drive element provided in a head unit in order to eject ink. JP-A-2021-84274 discloses a recording device that controls in a well-balanced manner density unevenness and graininess depending on the situation by determining a mask pattern to be used for the data process in the data process for generating recording data for an ejection operation.

In the technology in the related art described above, it is conceivable that the server is connected to either a recording device or a processing device that performs the data process, and the server transmits a control parameter for controlling the ejection operation in order to improve the results of the ejection operation. However, it is unclear whether the control parameter transmitted by the server is appropriate for the user using the recording device, and there is a problem that it is difficult to provide an appropriate control parameter to the user.

SUMMARY

According to an aspect of the present disclosure, an ink jet system according to the present disclosure includes a recording device on which a head unit that ejects ink is mounted, the recording device performing recording on a recording medium, a processing device connected to the recording device and performing a data process for causing the recording device to perform recording, and a server connectable to either the recording device or the processing device, wherein either the recording device or the processing device includes a receiver that receives a control parameter from the server, a controller that controls an ejection operation for ejecting ink from the head unit based on the control parameter, and a reception unit that receives evaluation information indicating an evaluation result obtained by causing a user to perform evaluation on one or a plurality of evaluation items of the control parameter in N levels of three or more after the ejection operation.

According to another aspect of the present disclosure, an ink jet system according to the present disclosure includes a recording device on which a head unit that ejects ink is mounted, the recording device performing recording on a recording medium, a processing device connected to the recording device and performing a data process for causing the recording device to perform recording, and a server connectable to either the recording device or the processing device, wherein either the recording device or the processing device includes a receiver that receives a control parameter from the server, a controller that controls an ejection operation for ejecting ink from the head unit based on the control parameter, and a reception unit that receives evaluation information indicating an evaluation result obtained by causing a user to individually perform evaluation on a first evaluation item and a second evaluation item different from each other of the control parameter, after the ejection operation.

BRIEF DESCRIPTION OF THE DRAWINGS

FIG. 4 is a schematic diagram illustrating an example of the configuration of an ink jet printer.

FIG. 13 is a diagram for explaining an example of a control parameter according to a first modification.

DESCRIPTION OF EMBODIMENTS

Hereinafter, embodiments for carrying out the present disclosure will be described with reference to the drawings. However, in each drawing, the dimensions and scale of each part are appropriately different from the actual ones. In addition, since the embodiments described below are preferable specific examples of the present disclosure, there are various technically preferred limitations. However, the scope of the present disclosure is not limited to these embodiments unless otherwise specified in the following description.

1. First Embodiment

1-1. Overview of Ink Jet System 10

Figure 1:
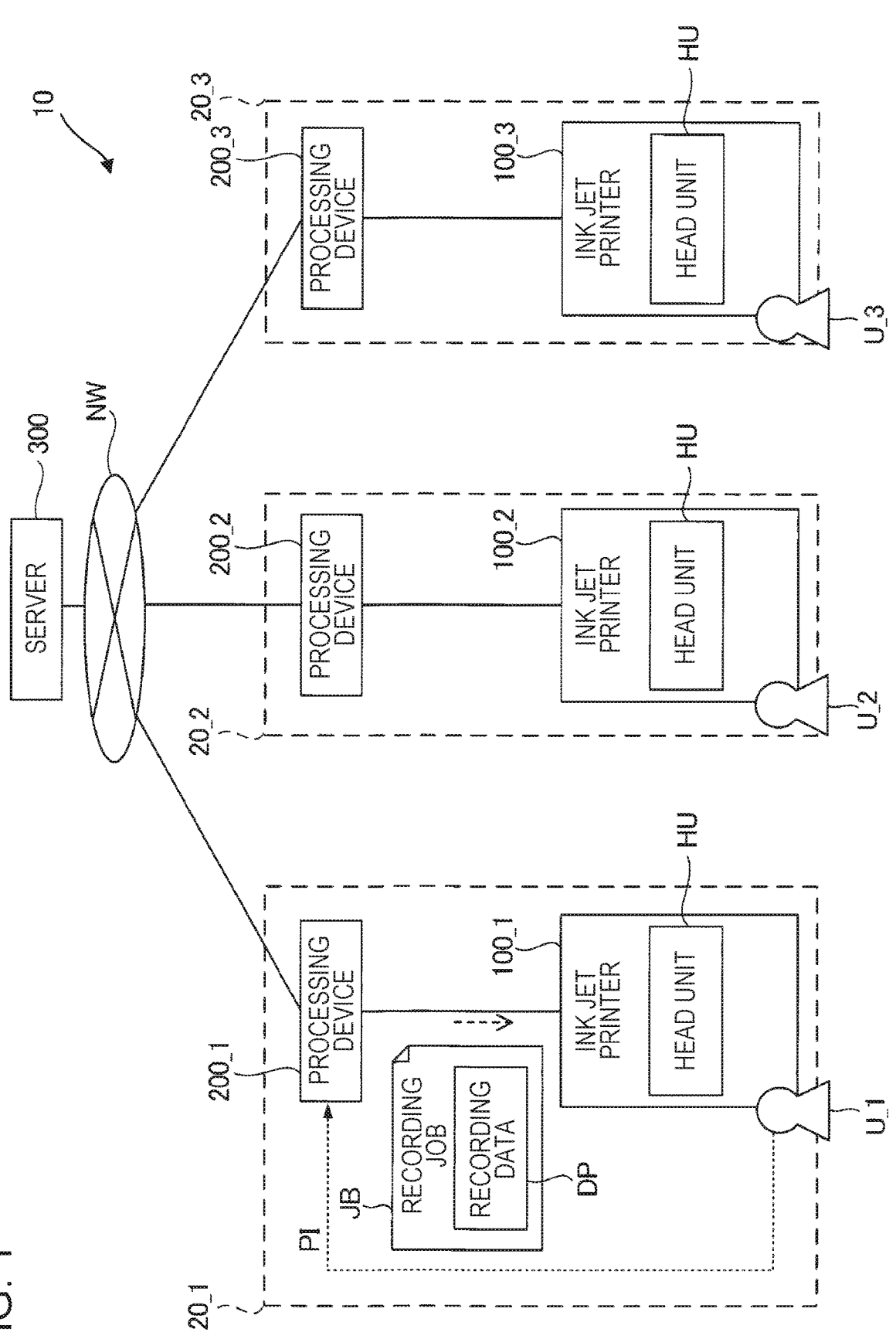
FIG. 1 is a schematic diagram showing the configuration example of an ink jet system according to a first embodiment.

FIG. 1 is a schematic diagram showing the configuration example of an ink jet system 10 according to the first embodiment. The ink jet system 10 is a system that performs recording on a recording medium PP, which will be described later, by an ink jet method. In an example shown in FIG. 1, the ink jet system 10 includes ink jet printers 100_1 to 100_3, processing devices 200_1 to 200_3, and a server 300.

Here, the ink jet printers 100_1 to 100_3 are provided by the manufacturer of the ink jet printers 100_1 to 100_3. In the following description, the ink jet printers 100_1 to 100_3 may be collectively referred to as an ink jet printer 100 without distinction. The ink jet printer 100 is a liquid ejection apparatus that ejects ink, which is an example of a liquid. The manufacturer of the ink jet printer 100 is a company that manufactures the ink jet printer 100. The manufacturer of the ink jet printer 100 may be referred to as a "printer manufacturer". Each of the ink jet printers 100_1 to 100_3 may be provided by the same printer manufacturer, or may be provided by different printer manufacturers. However, a head unit HU incorporated in the ink jet printers 100_1 to 100_3 is provided by the manufacturer of the head unit HU. The head unit HU manufacturer is a company that manufactures the head unit HU. Hereinafter, the manufacturer of the head unit HU may be referred to as a "head manufacturer". The printer manufacturer manufactures the ink jet printer 100 by receiving the head unit HU from the head manufacturer and incorporating the provided head unit HU into the ink jet printer 100. The ink jet printer 100 is an example of a "recording device".

FIG. 1 shows a user U_1 using the ink jet printer 100_1, a user U_2 using the ink jet printer 100_2, and a user U_3 using the ink jet printer 100_3. In the following description, the users U_1 to U_3 may be collectively referred to as a user U without distinction. For example, when a worker belonging to a printer manufacturer uses the ink jet printer 100, the worker is the user U. Further, for example, when a third party who has received the ink jet printer 100 from the printer manufacturer uses the ink jet printer 100, the third party is the user U. In the following description, a third party who receives the ink jet printer 100 from the printer manufacturer may be referred to as an "end user". For each integer i from 1 to 3, a user U_i uses a processing device 200_i in addition to an ink jet printer 100_i.

The ink jet printer 100_1 is communicably connected to the processing device 200_1. The ink jet printer 100_2 is communicatively connected to the processing device 200_2. The ink jet printer 100_3 is communicatively connected to the processing device 200_3. In this way, the ink jet printers 100_1 to 100_3 correspond to the processing devices 200_1 to 200_3, respectively, and are communicably connected to the processing devices 200_1 to 200_3, respectively. In the following description, the processing devices 200_1 to 200_3 may be collectively referred to as a processing device 200 without distinction.

Also, hereinafter, a recording system 20_i may be described for each integer i from 1 to 3. The recording system 20_i includes an ink jet printer 100_i and a processing device 200_i. In the following description, the recording systems 20_1 to 20_3 may be collectively referred to as a recording system 20 without distinction. It can also be said that the ink jet system 10 includes the recording systems 20_1 to 20_3 and the server 300.

In the example shown in FIG. 1, the ink jet system 10 includes three ink jet printers 100 and three processing devices 200, but the number is not limited to three, and may be one, two, or four or more. That is, the number of pairs of the ink jet printer 100 and the processing device 200 is not limited to three, and may be one, two, or four or more.

The ink jet printer 100 receives a recording job JB for executing a recording process from the processing device 200. The recording job JB includes identification information (not shown) that uniquely identifies the recording job JB, and recording data DP that indicates an image to be formed on the recording medium PP. Furthermore, the recording job JB may include information indicating the number of print copies of the image to be formed on the recording medium PP. The recording job JB is generated by the processing device 200 when the processing device 200 is notified of a recording instruction PI by the operation by the user U. The recording instruction PI includes information identifying image data that is the source of the recording data DP is based. The image data is data in file formats such as PostScript, PDF, and XPS. PDF is an abbreviation for a Portable Document Format. XPS is an abbreviation for an XML Paper Specification. The information identifying the image data is, for example, the file path of the image data stored in the processing device 200. The ink jet printer 100 forms an image based on the recording data DP on the recording medium PP.

The recording medium PP is not particularly limited as long as it is a medium on which the ink jet printer 100 can perform printing, and examples thereof include various types of paper, various types of cloth, and various types of films.

The ink jet printer 100 has one head unit HU. In the following description, the head unit HU ejects ink from nozzles Nz provided in the head unit HU. Hereinafter, the elements constituting the ink jet printer 100 excluding the head unit HU may be referred to as a "printer main body".

In the example shown in FIG. 1, the ink jet printer 100 has one head unit HU, but the number of the head units HU is not limited to one, and may be two or more.

The processing device 200 is a desktop or notebook computer. The processing device 200 executes an image process for generating the recording data DP and a process for controlling printing by the ink jet printer 100. In the image process, the processing device 200 generates the recording data DP by executing various types of processes such as a color conversion process and a RIP process on image data in file formats such as PostScript, PDF, and XPS. PDF is an abbreviation for a Portable Document Format. XPS is an abbreviation for an XML Paper Specification. RIP is an abbreviation for a Raster image processor. The image data in the file format is, for example, data that the user U instructs the object on which the ejection operation is to be performed. The color conversion process is a process for converting RGB values represented by image data in a file format into CMYK values, CMY values, or the like, which are colors of ink used by the ink jet printer 100 with reference to a lookup table. In the following description, an example of conversion to CMY values will be used. The lookup table defines the correspondence between RGB values and CMY values. The RIP process is a process for generating the recording data DP, which is data with which the ink jet printer 100 can perform printing, using information indicating a dither pattern and information indicating an error diffusion matrix.

The processing device 200 is communicably connected to the server 300 via a network NW such as a LAN, a WAN, and the Internet. LAN is an abbreviation for a local area network. WAN is an abbreviation for a wide area network.

The server 300 is a computer that functions as a cloud server CS, which will be described later. The server 300 is managed by a business operator different from, for example, a head manufacturer, a printer manufacturer, and an end user. Hereinafter, the business operator that manages the server 300 may be referred to as a "server business operator". The head manufacturer uses part of the server 300.

1-2. Configuration of Server 300

Figure 2:
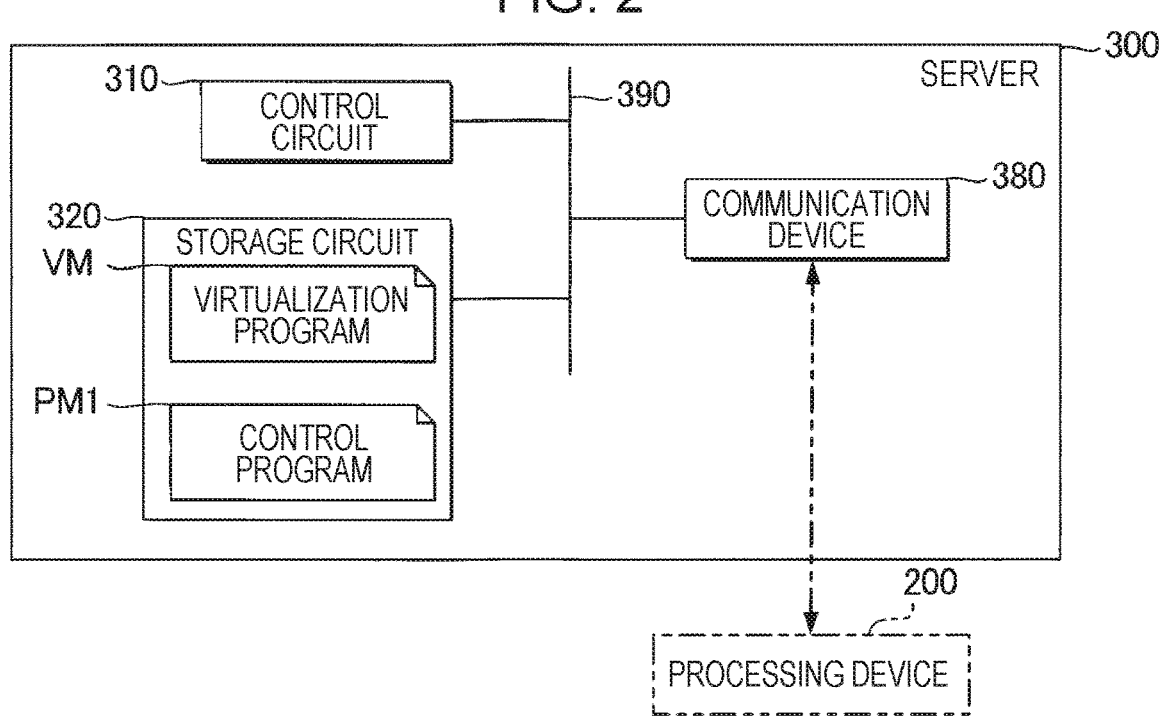
FIG. 2 is a diagram showing an example of the configuration of a server.

FIG. 2 is a diagram showing an example of the configuration of the server 300. The server 300 includes a control circuit 310, a storage circuit 320, and a communication device 380. The control circuit 310, the storage circuit 320, and the communication device 380 are interconnected by a bus 390 for communicating information.

The control circuit 310 includes a processor, such as, for example, one or more CPUs. CPU is an abbreviation for a central processing unit. Note that the control circuit 310 may include a programmable logic device such as an FPGA instead of or in addition to the CPU. FPGA is an abbreviation for a field programmable gate array.

The storage circuit 320 is composed of a magnetic storage device, a flash ROM, or the like. The storage circuit 320 stores a plurality of programs including a virtualization program VM and a control program PM1 readable by the control circuit 310 and executed by the control circuit 310, various pieces of information used by the control circuit 310, and the like. The virtualization program VM divides resources such as the control circuit 310 and the storage circuit 320 of the server 300 into a plurality of resources, and operates each of the divided resources as the cloud server CS. The head manufacturer uses some of the plurality of cloud servers CS as part of the server 300. The control program PM1 is developed by the head manufacturer.

However, the storage circuit 320 may not have the virtualization program VM, and the processing device 200 may access the server 300 instead of the cloud server CS.

The storage circuit 320 includes, for example, semiconductor memory of one or both of one or a plurality of volatile memories such as a RAM and one or a plurality of non-volatile memories such as a ROM, an EEPROM or a PROM. RAM is an abbreviation for a random access memory. ROM is an abbreviation for a read only memory. EEPROM is an abbreviation for an electrically erasable programmable read-only memory. PROM is an abbreviation for a programmable ROM.

The communication device 380 is hardware having a communication circuit for communicating with the processing device 200 via the network NW. The communication device 380 is also referred to as a network device, network controller, network card, or communication module, for example.

1-3. Configuration of Processing Device 200

Figure 3:
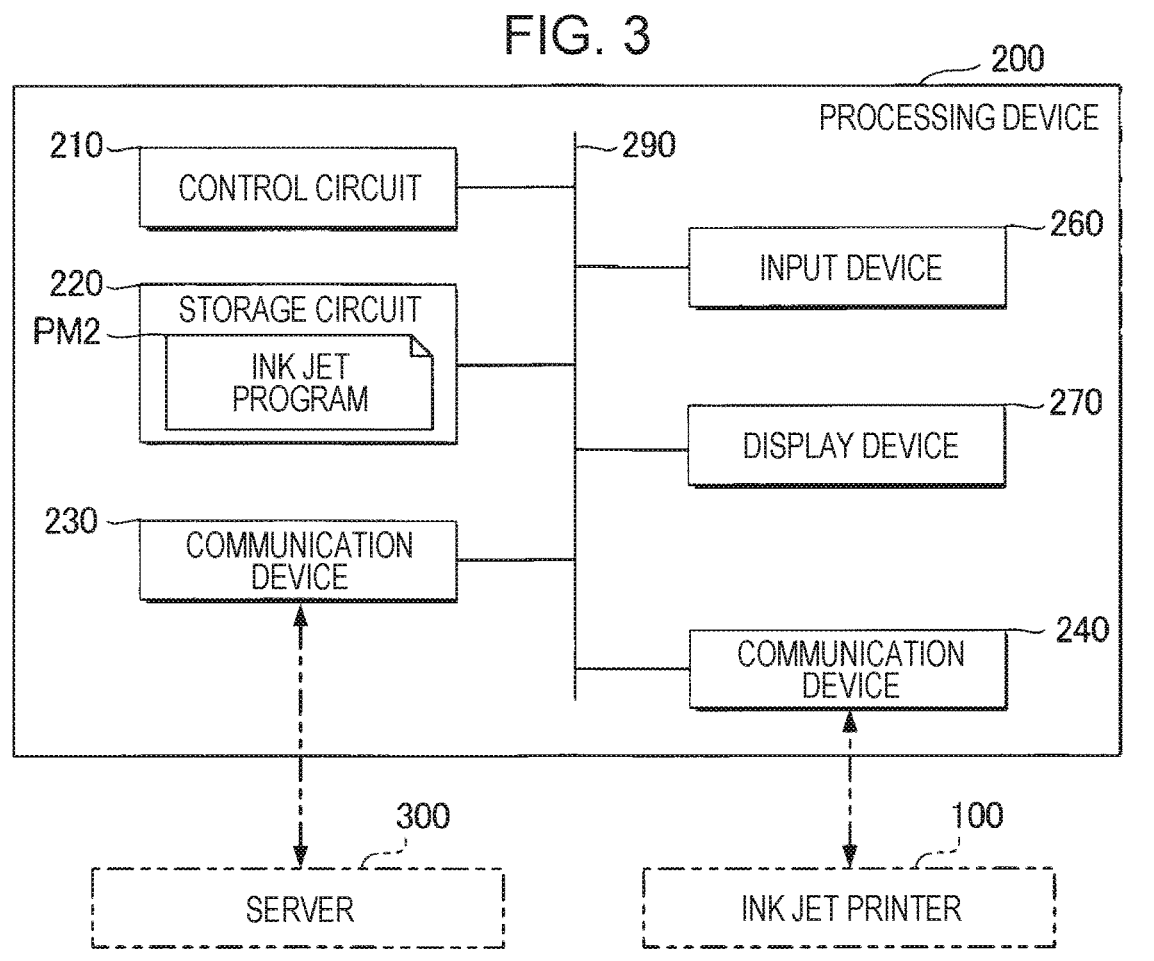
FIG. 3 is a diagram showing the configuration of a processing device.

FIG. 3 is a diagram showing the configuration of the processing device 200. The processing device 200 includes a control circuit 210, a storage circuit 220, a communication device 230, an input device 260, and a display device 270. The control circuit 210, the storage circuit 220, the communication device 230, the input device 260, and the display device 270 are interconnected by a bus 290 for communicating information. Note that the display device 270 is an example of a "display unit".

The control circuit 210 includes a processor, such as, for example, one or more CPUs. Note that the control circuit 210 may include a programmable logic device such as an FPGA instead of or in addition to the CPU.

The storage circuit 220 is composed of a magnetic storage device, a flash ROM, or the like. The storage circuit 220 stores a plurality of programs including an ink jet program PM2 readable by the control circuit 210, and executed by the control circuit 210, various pieces of information used by the control circuit 210, and the like. The storage circuit 220 includes, for example, semiconductor memory of one or both of one or a plurality of volatile memories such as a RAM and one or a plurality of non-volatile memories such as a ROM, an EEPROM or a PROM. The ink jet program PM2 is downloaded from the cloud server CS operating on the server 300 and installed in the processing device 200 when the processing device 200 is connected to the ink jet printer 100, for example.

The communication device 230 is hardware having a communication circuit for communicating with the processing device 200 via the network NW. The communication device 230 is also referred to as a network device, network controller, network card, or communication module, for example.

A communication device 240 is a circuit capable of communicating with the ink jet printer 100. For example, the communication device 240 is a network card such as USB or Bluetooth. USB is an abbreviation for a Universal Serial Bus. USB and Bluetooth are registered trademarks. Generally, the communication speed between the processing device 200 and the server 300 is slower than the communication speed between the processing device 200 and the ink jet printer 100.

The input device 260 is a device that outputs operation information according to the operation by the user U. Input device 260 includes, for example, a mouse and a keyboard.

The display device 270 displays to the user U an image showing some information. The display device 270 includes an organic EL display, an LED display, or an LCD. EL is an abbreviation for an electro-luminescence. LED is an abbreviation for a light emitting diode. LCD is an abbreviation for a liquid crystal display. Alternatively, the input device 260 and the display device 270 may be integrated. A configuration in which the input device 260 and the display device 270 are integrated is, for example, a touch panel.

As shown in FIGS. 1 to 3, there is a business model in which the head manufacturer provides the printer manufacturer with the head unit HU, and the printer manufacturer builds the head unit HU into the printer main body to manufacture the ink jet printer 100. In this business model, printer manufacturers generally design and manufacture components other than the head unit HU. In the present embodiment, the head manufacturer prepares the cloud server CS and the ink jet program PM2 that runs on the processing device 200, and the user U connects the processing device 200 to the cloud server CS and causes the processing device 200 to execute the ink jet program PM2. As described above, in the present embodiment, the printer manufacturer does not have to prepare the ink jet program PM2, so that the design and manufacturing load on the printer manufacturer can be reduced.

1-4. Configuration of Ink Jet Printer 100

Figure 4:
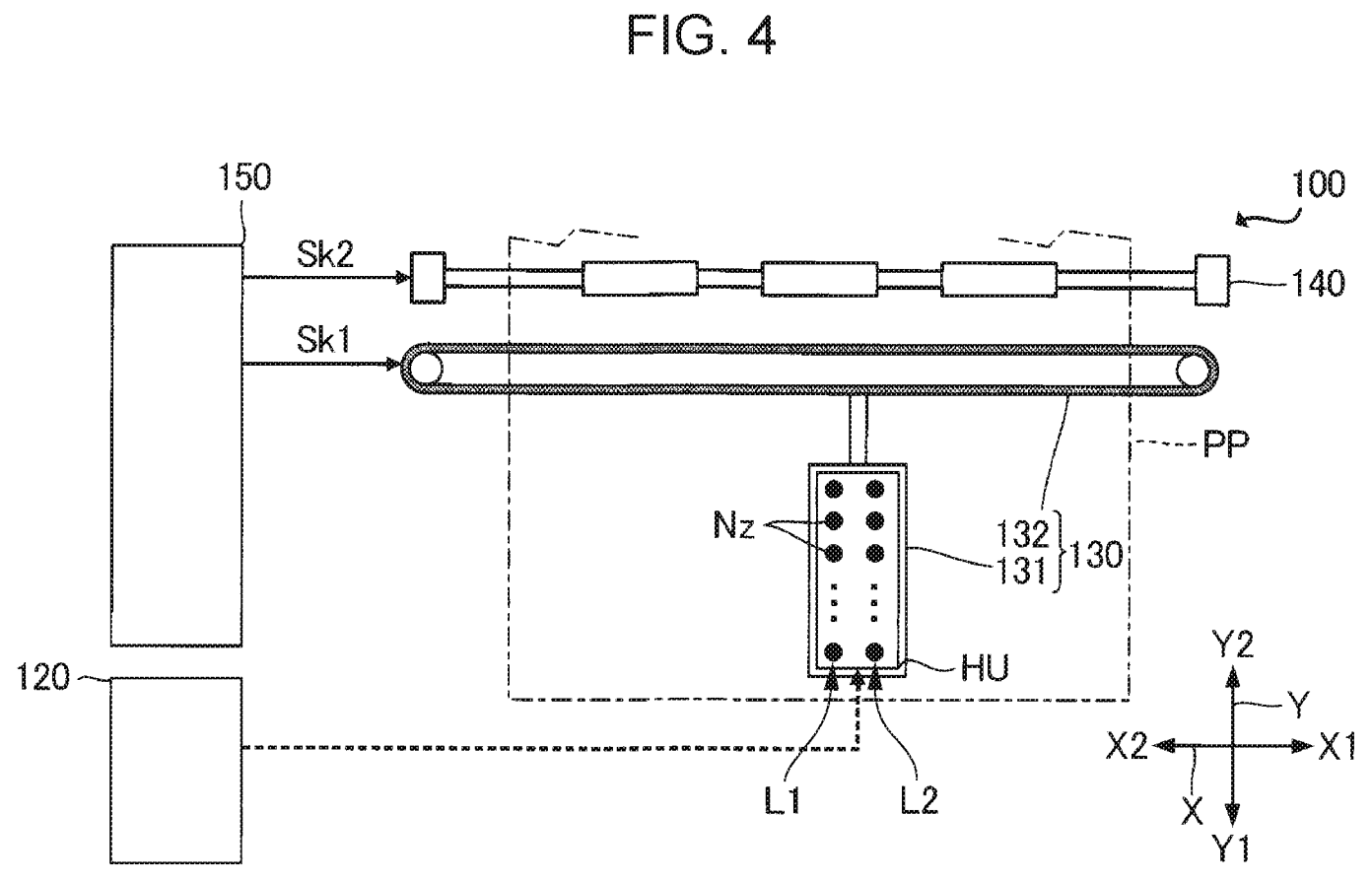
Figure 5:
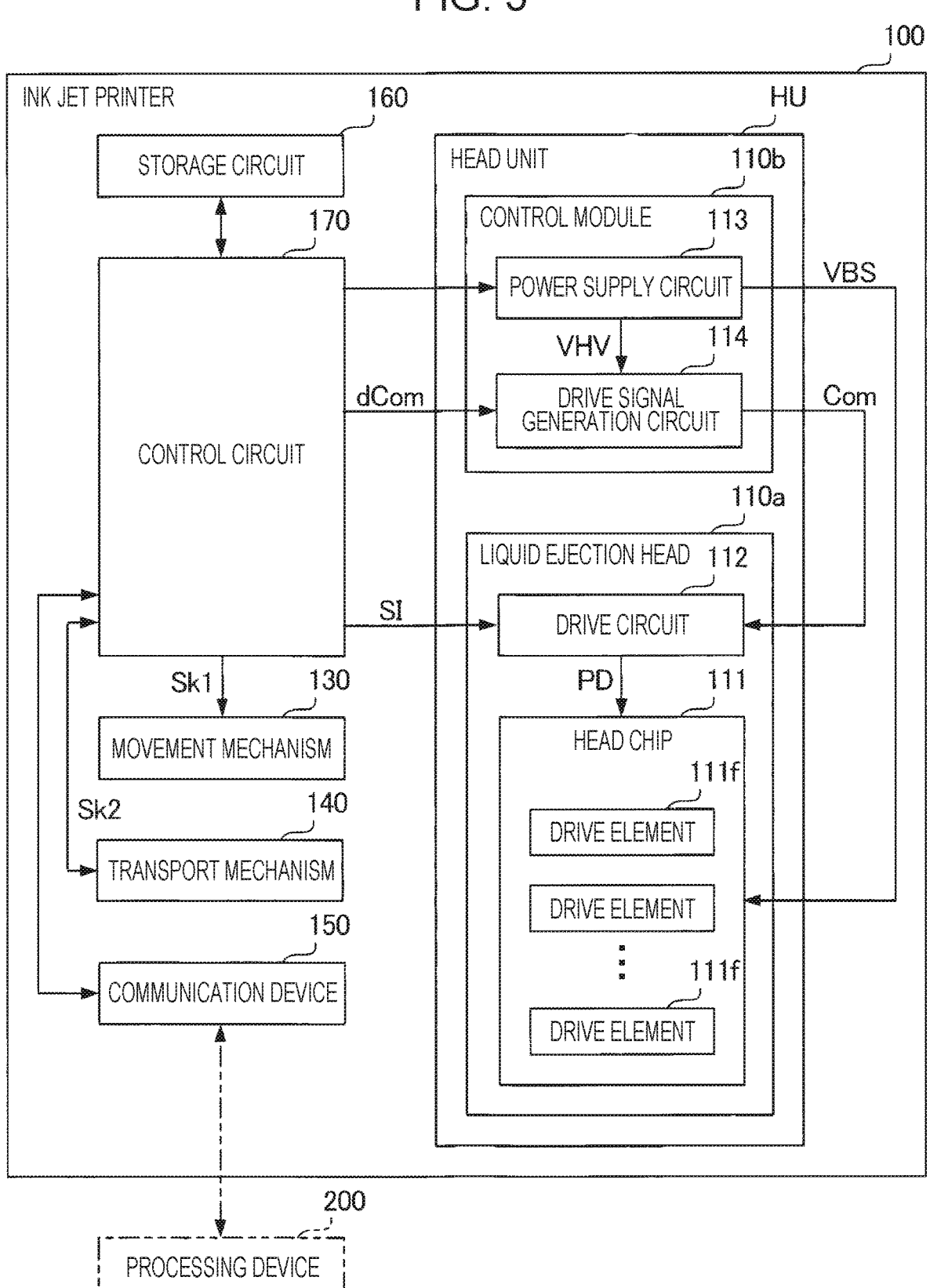
FIG. 5 is a block diagram showing the configuration example of the ink jet printer.

FIG. 4 is a schematic diagram illustrating an example of the configuration of the ink jet printer 100. FIG. 5 is a block diagram showing the configuration example of the ink jet printer 100. The X axis, the Y axis, and the Z axis that are mutually orthogonal to each other are assumed in the following description. One direction along the X axis when viewed from an any point is denoted as an X1 direction, and a direction opposite to the X1 direction is denoted as an X2 direction. Similarly, mutually opposite directions along the Y axis from an any point are denoted as a Y1 direction and a Y2 direction, and mutually opposite directions along the Z axis from an any point are denoted as a Z1 direction and a Z2 direction. The X-Y plane, which includes the X axis and the Y axis, corresponds to the horizontal plane. The Z axis is an axis along the vertical direction, and the Z2 direction corresponds to the downward direction in the vertical direction.

An ink jet printer 100 according to the first embodiment is a serial printer that forms an image on the recording medium PP by a multi-pass method. The multi-pass method refers to forming an image on the recording medium PP by scanning a plurality of times. Specifically, as shown in FIG. 4, the ink jet printer 100 according to the first embodiment transports the recording medium PP in the Y1 direction, which is the sub-scanning direction, and executes an ejection operation for forming an image on the recording medium PP by ejecting ink from the nozzles Nz, while moving the head unit HU in the X1 direction and in the X2 direction, which are the main scanning direction. FIG. 4 representatively illustrates some nozzles Nz of the plurality of nozzles Nz of the head unit HU.

As shown in FIGS. 4 and 5, the ink jet printer 100 includes the head unit HU, a liquid container 120, a movement mechanism 130, a transport mechanism 140, a communication device 150, a storage circuit 160, a control circuit 170.

The head unit HU is an assembly includes a head chip 111, a drive circuit 112, a power supply circuit 113, and a drive signal generation circuit 114.

In the example shown in FIG. 5, the head unit HU is divided into a liquid ejection head 110*a* including the head chip 111 and the drive circuit 112, and a control module 110*b* including the power supply circuit 113 and the drive signal generation circuit 114. The head unit HU is not limited to the aspect in which the unit is divided into the liquid ejection head 110*a* and the control module 110*b*. For example, part or all of the control module 110*b* may be incorporated into the liquid ejection head 110*a*.

The head chip 111 ejects ink toward the recording medium PP. In FIG. 5, among the components of the head chip 111, a plurality of drive elements 111*f* is representatively illustrated. An example of details of the head chip 111 will be described later with reference to FIG. 6.

In the example shown in FIG. 5, the number of the head chips 111 included in the head unit HU is one, but the number may be two or more. One or more head chips 111 are disposed so that a plurality of nozzles Nz is distributed over part of the width direction of the recording medium PP.

Under the control of the control circuit 170, the drive circuit 112 switches whether to supply a drive signal Com output from the drive signal generation circuit 114 to each of the plurality of drive elements 111*f* of the head chip 111. The drive circuit 112 includes, for example, a group of switches such as transmission gates for the switching.

The power supply circuit 113 receives power from a commercial power supply (not shown) and generates various predetermined potentials. The generated various potentials are appropriately supplied to respective components of the ink jet printer 100. In the example shown in FIG. 5, the power supply circuit 113 generates power supply potential VHV and offset potential VBS. The offset potential VBS is supplied to the head chip 111 and the like. In addition, the power supply potential VHV is supplied to the drive signal generation circuit 114 and the like.

The drive signal generation circuit 114 is a circuit that generates the drive signal Com for driving each drive element 111*f* of the head chip 111. Specifically, the drive signal generation circuit 114 includes, for example, a DA conversion circuit and an amplifier circuit. In the drive signal generation circuit 114, the DA conversion circuit converts a waveform designation signal dCom to be later described from the control circuit 170 from a digital signal to an analog signal, and the amplifier circuit amplifies the analog signal using the power supply potential VHV from the power supply circuit 113 to generate the drive signal Com. Here, among the waveforms included in the drive signal Com, the waveform signal actually supplied to the drive element 111*f* is a drive pulse PD.

As illustrated in FIG. 4, the ink jet printer 100 includes the liquid container 120 that stores ink. For example, a cartridge that is attachable to and detachable from the ink jet printer 100, a bag-shaped ink pack formed of a flexible film, or an ink tank that can be refilled with ink is used as the liquid container 120.

Under the control of the control circuit 170, the movement mechanism 130 and the transport mechanism 140 move the relative positions of the recording medium PP and the head unit HU. Moving the relative position may mean moving the head unit HU while fixing the position of the recording medium PP, or moving the recording medium PP while fixing the position of the head unit HU. In the present embodiment, in the direction along the X axis, which is the main scanning direction, the head unit HU is moved in the direction along the X axis while the position of the recording medium PP on the X axis is fixed, and in the Y1 direction, which is the sub-scanning direction, the recording medium PP is moved in the Y1 direction while the position of the head unit HU on the Y axis is fixed.

The movement mechanism 130 reciprocates the head unit HU along the X axis under the control of the control circuit 170. As shown in FIG. 4, the movement mechanism 130 includes a substantially box-shaped carriage 131 that houses the head unit HU, and an endless belt 132 to which the head unit HU is fixed. A configuration in which the liquid container 120 together with the head unit HU is mounted on the carriage 131 may also be used.

The transport mechanism 140 transports the recording medium PP in the Y1 direction under the control of the control circuit 170. Specifically, the transport mechanism 140 includes a transport roller (not shown) whose rotation axis is parallel to the X axis, and a motor (not shown) that rotates the transport roller under the control of the control circuit 170.

The communication device 150 is a circuit capable of communicating with the processing device 200. For example, the communication device 150 is a network card such as USB or Bluetooth. Also, the communication device 150 may be integrated with the control circuit 170.

The storage circuit 160 stores various programs executed by the control circuit 170 and various pieces of data such as the recording job JB processed by the control circuit 170. The storage circuit 160 includes, for example, semiconductor memory of one or both of one or a plurality of volatile memories such as a RAM and one or a plurality of non-volatile memories such as a ROM, an EEPROM or a PROM. Note that the storage circuit 160 may be configured as part of the control circuit 170.

The control circuit 170 has a function of controlling the operation of each component of the ink jet printer 100 and a function of processing various pieces of data. The control circuit 170 includes, for example, a processor, such as one or more CPUs. Note that the control circuit 170 may include a programmable logic device such as an FPGA instead of or in addition to the CPU.

The control circuit 170 controls the operation of each component of the ink jet printer 100 by executing programs stored in the storage circuit 160. Here, the control circuit 170 generates signals such as a control signal Sk1, a control signal Sk2, a print signal SI, and the waveform designation signal dCom as signals for controlling the operation of each component of the ink jet printer 100.

The control signal Sk1 is a signal for controlling driving of the movement mechanism 130. The control signal Sk2 is a signal for controlling driving of the transport mechanism 140. The print signal SI is a signal for controlling driving of the drive circuit 112. Specifically, the print signal SI designates for each predetermined unit period whether the drive circuit 112 supplies the drive signal Com from the drive signal generation circuit 114 to the drive element 111*f*. By this designation, the amount of ink ejected from the head chip 111 and the like are designated. The waveform designation signal dCom is a digital signal for defining the waveform of the drive signal Com generated by the drive signal generation circuit 114.

When the ejection operation is executed, the control circuit 170 first causes the storage circuit 160 to store the recording job JB supplied from the processing device 200. Next, the control circuit 170 generates various control signals such as the print signal SI, the waveform designation signal dCom, the control signal Sk1, and the control signal Sk2 based on various pieces of data such as the recording data DP included in the recording job JB stored in the storage circuit 160. Based on various control signals and various pieces of data stored in the storage circuit 160, the control circuit 170 controls the transport mechanism 140 and the movement mechanism 130 so as to change the relative position of the recording medium PP with respect to the head unit HU, and controls the head unit HU so that the drive element 111*f* is driven. Accordingly, the control circuit 170 adjusts the presence or absence of ink ejection from the drive element 111*f*, the amount of ink ejected, the ejection timing of ink, and the like, and controls the execution of the ejection operation of forming an image based on the recording data DP on the recording medium PP.

Figure 6:
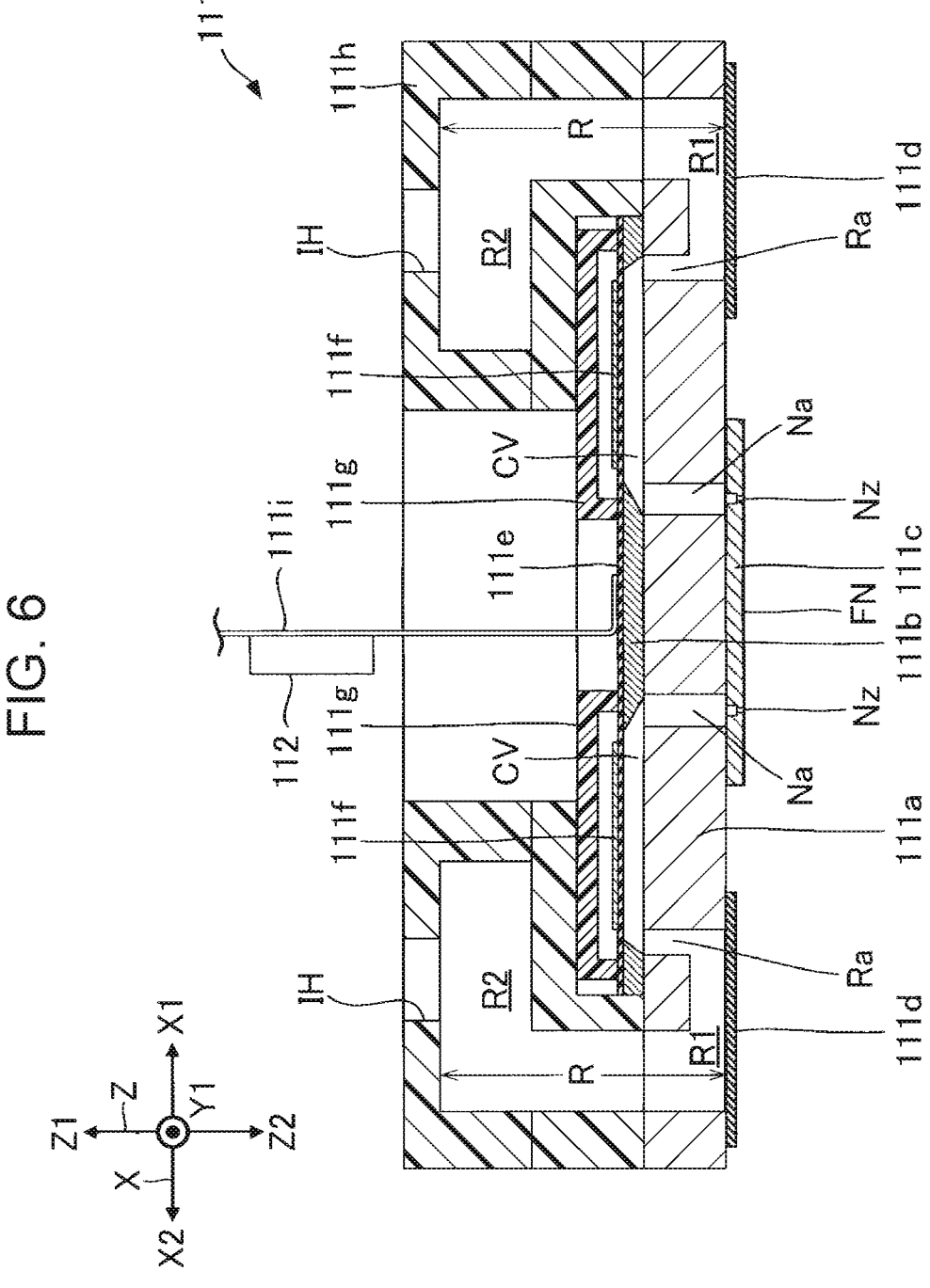
FIG. 6 is a cross-sectional view showing the configuration example of a head chip.

FIG. 6 is a cross-sectional view showing a configuration example of the head chip 111. In the following description, X axis, Y axis and Z axis that intersect with each other are appropriately used. Hereinafter, one direction along the X axis is the X1 direction, and a direction opposite to the X1 direction is the X2 direction. Similarly, the directions opposite to each other along the Y axis are the Y1 direction and the Y2 direction. The directions opposite to each other along the Z axis are the Z1 direction and the Z2 direction.

As shown in FIGS. 4 and 6, the head chip 111 has a plurality of nozzles Nz disposed along the Y axis. As shown in FIG. 4, the plurality of nozzles Nz is divided into a first row L1 and a second row L2 spaced apart from each other in the direction along the X axis. Each of the first row L1 and the second row L2 is a set of a plurality of nozzles Nz linearly disposed in the direction along the Y axis.

The head chips 111 are substantially symmetrical to each other in the direction along the X axis. However, the positions of the plurality of nozzles Nz in the first row L1 and the positions of the plurality of nozzles Nz in the second row L2 in the direction along the Y axis may be the same or different. FIG. 6 illustrates a configuration in which the positions of the plurality of nozzles Nz of the first row L1 and the positions of the plurality of nozzles Nz of the second row L2 in the direction along the Y axis are the same.

As shown in FIG. 6, the head chip 111 includes a flow path substrate 111*a*, a pressure chamber substrate 111*b*, a nozzle plate 111*c*, a vibration absorber 111*d*, a vibration plate 111*e*, a plurality of drive elements 111*f*, a protection plate 111*g*, a case 111*h*, and a wiring substrate 111*i*.

The flow path substrate 111*a* and the pressure chamber substrate 111*b* are stacked in this order in the Z1 direction to form flow paths for supplying ink to the plurality of nozzles Nz. The vibration plate 111*e*, the plurality of drive elements 111*f*, the protection plate 111*g*, the case 111*h*, and the wiring substrate 111*i* are installed in a region located in the Z1 direction relative to the laminate composed of the flow path substrate 111*a* and the pressure chamber substrate 111*b*. On the other hand, the nozzle plate 111*c* and the vibration absorber 111*d* are installed in a region located in the Z2 direction relative to the laminate. Respective components of the head chip 111 are generally plate-shaped members elongated in the Y direction, and are bonded to each other with an adhesive, for example. The components of the head chip 111 will be described in order below.

The nozzle plate 111*c* is a plate-shaped member provided with a plurality of nozzles Nz for each of the first row L1 and the second row L2. Each of the plurality of nozzles Nz is a through hole through which ink passes. Here, the face, of the nozzle plate 111*c*, facing the Z2 direction is a nozzle face FN. The nozzle plate 111*c* is manufactured, for example, by processing a silicon single crystal substrate by a semiconductor manufacturing technique using a processing technique such as dry etching or wet etching. However, other known methods and materials may be used as appropriate for manufacturing the nozzle plate 111*c*. In addition, the cross-sectional shape of the nozzle is typically circular, but is not limited to this, and may be non-circular such as polygonal or elliptical.

The flow path substrate 111*a* has a space R1, a plurality of supply flow paths Ra, and a plurality of communication flow paths Na for each of the first row L1 and the second row L2. The space R1 is an elongated opening extending in the direction along the Y axis in plan view along the Z axis. Each of the supply flow path Ra and the communication flow path Na is a through hole formed for a nozzle Nz. Each supply flow path Ra communicates with the space R1.

The pressure chamber substrate 111*b* is a plate-shaped member provided with a plurality of pressure chambers CV called cavities for each of the first row L1 and the second row L2. The plurality of pressure chambers CV is disposed in a direction along the Y axis. Each pressure chamber CV is an elongated space formed for a nozzle Nz and extending in the direction along the X axis in plan view. In the same manner as the nozzle plate 111*c* described above, each of the flow path substrate 111*a* and the pressure chamber substrate 111*b* is manufactured, for example, by processing a silicon single crystal substrate by a semiconductor manufacturing technique. However, other known methods and materials may be appropriately used for manufacturing the flow path substrate 111*a* and the pressure chamber substrate 111*b*.

The pressure chamber CV is a space located between the flow path substrate 111*a* and the vibration plate 111*e*. The plurality of pressure chambers CV is disposed in the direction along the Y axis for each of the first row L1 and the second row L2. Further, the pressure chamber CV communicates with each of the communication flow path Na and the supply flow path Ra. Therefore, the pressure chamber CV communicates with the nozzle Nz via the communication flow path Na and communicates with the space R1 via the supply flow path Ra.

The vibration plate 111*e* is disposed on the face, of the pressure chamber substrate 111*b*, facing the Z1 direction. The vibration plate 111*e* is a plate-shaped member that can vibrate elastically. The vibration plate 111*e* has, for example, a first layer and a second layer, which are stacked in this order in the Z1 direction. The first layer is, for example, an elastic film made of silicon oxide (SiO2). The elastic film is formed, for example, by thermally oxidizing one face of a silicon single crystal substrate. The second layer is an insulating film made of, for example, zirconium oxide (ZrO2). The insulating film is formed, for example, by forming a zirconium layer by sputtering and thermally oxidizing the layer. Note that the vibration plate 111e is not limited to the lamination of the first layer and the second layer described above, and may be composed of a single layer or three or more layers, for example.

The plurality of drive elements 111f corresponding to the nozzles Nz is disposed for each of the first row L1 and the second row L2 on the face, of the vibration plate 111e, facing the Z1 direction. Each drive element 111f is a passive element that deforms when supplied with the drive signal Com. Each drive element 111f has an elongated shape extending in the direction along the X axis in plan view. The plurality of drive elements 111f is disposed in a direction along the Y axis so as to correspond to the plurality of pressure chambers CV. The drive element 111f overlaps the pressure chamber CV in plan view.

Each drive element 111f is a piezoelectric element and has a first electrode, a piezoelectric layer and a second electrode (not shown), which are stacked in this order in the Z1 direction. One electrode of the first electrode and the second electrode is an individual electrode that is spaced apart from each other for each drive element 111f, and the one electrode is supplied with the drive pulse PD. The other electrode of the first electrode and the second electrode is a band-shaped common electrode that extends in the direction along the Y axis so as to be continuous over the plurality of drive elements 111f, and the other electrode is supplied with the offset potential VBS. Examples of metal materials for these electrodes include metal materials such as platinum (Pt), aluminum (Al), nickel (Ni), gold (Au), and copper (Cu). They can be used alone or in combination of two or more in the form of an alloy, lamination, or the like. The piezoelectric layer is made of a piezoelectric material such as lead zirconate titanate (Pb(Zr, Ti)O3) and has a band shape extending in the direction along the Y axis so as to be continuous over the plurality of drive elements 111f, for example. However, the piezoelectric layer may be integrated over the plurality of drive elements 111f. In this case, the piezoelectric layer is provided with a through hole extending in the direction along the X axis and penetrating through the piezoelectric layer in a region corresponding to the gap between the pressure chambers CV adjacent to each other in plan view. When the vibration plate 111e vibrates in association with the deformation of the drive element 111f, the pressure in the pressure chamber CV fluctuates, and ink is ejected from the nozzle Nz.

The protection plate 111g is a plate-shaped member installed on the face, of the vibration plate 111e, facing the Z1 direction, and protects the plurality of drive elements 111f and reinforces the mechanical strength of the vibration plate 111e. Here, a plurality of drive elements 111f is accommodated between the protection plate 111g and the vibration plate 111e. The protection plates 111g is made of a resin material, for example.

The case 111h is a member for storing ink supplied to the plurality of pressure chambers CV. The case 111h is made of, for example, a resin material. The case 111h has a space R2 for each of the first row L1 and the second row L2. The space R2 is a space that communicates with the aforementioned space R1, and functions together with the space R1 as a reservoir R that stores ink supplied to each of the plurality of pressure chambers CV. The case 111h has an introduction port IH for supplying ink to each reservoir R. The ink in each reservoir R is supplied to the pressure chamber CV through each supply flow path Ra.

The vibration absorber 111d, which is also referred to as a compliance substrate, is a flexible resin film forming a wall face of the reservoir R, and absorbs pressure fluctuations of the ink in the reservoir R. Note that the vibration absorber 111d may be a flexible thin plate made of metal. The face, of the vibration absorber 111d, facing the Z1 direction is bonded to the flow path substrate 111a with an adhesive or the like.

The wiring substrate 111i is mounted on the face, of the vibration plate 111e, facing the Z1 direction, and is a mounting component for electrically connecting the head chip 111, and the drive circuit 112, the control module 110b, and the like. The wiring substrate 111i is, for example, a flexible wiring substrate such as COF, FPC, or FFC. The aforementioned drive circuit 112 is mounted on the wiring substrate 111i of the present embodiment. COF is an abbreviation for a chip on film. FPC is an abbreviation for a flexible printed circuit. FFC is an abbreviation for a flexible flat cable.

1-5. Control Parameter CP

In the present embodiment, the connection of the recording system 20 to the cloud server CS can be used to transmit use condition information UI related to the use condition of the head unit HU to the cloud server CS. The head manufacturer provides the cloud server CS with a function of transmitting the control parameter CP suitable for the use condition information UI, so that the cloud server CS can transmit the control parameter CP suitable for the use condition of the head unit HU to the recording system 20. The control parameter CP is a parameter that controls the ejection operation. The control parameter CP is, for example, a parameter related to the drive signal Com or a parameter related to the image process, which is a data process for generating the recording data DP. For simplification of explanation, in the present embodiment, the description is made assuming that the control parameter CP is a parameter related to the drive signal Com. Since the control parameter CP is transmitted to the recording system 20, the printer manufacturer and the end user do not need to set the ejection operation according to the use condition of the head unit HU, so that the man-hour load on the printer manufacturer and the end user is greatly reduced.

Here, while the cloud server CS provides the recording system 20 with the control parameter CP that are assumed to be appropriate based on the use condition of the head unit HU by the printer manufacturer or the end user, there is a problem that whether the provided control parameter CP are actually appropriate is unclear unless the ejection operation is performed using the control parameter CP. Specifically, the quality of the image formed on the recording medium PP is evaluated by sensory evaluation using the five human senses. With regard to image quality, this problem is conspicuous because different users U prefer different conditions.

Therefore, in the present embodiment, the printer manufacturer or the end user is allowed to use the control parameter CP, and the processing device 200 transmits information indicating whether the control parameter CP can be used to the cloud server CS, so that the head manufacturer can know whether the control parameter CP provided is allowed.

However, the information indicating whether the control parameter CP can be used does not provide knowledge of how appropriate the control parameter CP was. Therefore, even when the head manufacturer tries to apply an appropriate control parameter CP from the next time onward, there is a problem that it is unclear to what extent the control parameter CP provided last time should be changed. Therefore, the processing device 200 according to the first embodiment receives evaluation information HI obtained by causing the user U to perform evaluation on one or a plurality of evaluation items of the control parameter CP in N levels of three or more. N is an integer. By receiving the evaluation information HI by the processing device 200, the head manufacturer can obtain knowledge about to what extent the control parameter CP provided last time should be changed.

1-6. Function and Operation of Ink Jet System 10

The function and operation of the ink jet system 10 will be described with reference to FIGS. 7 to 12.

Figure 7:
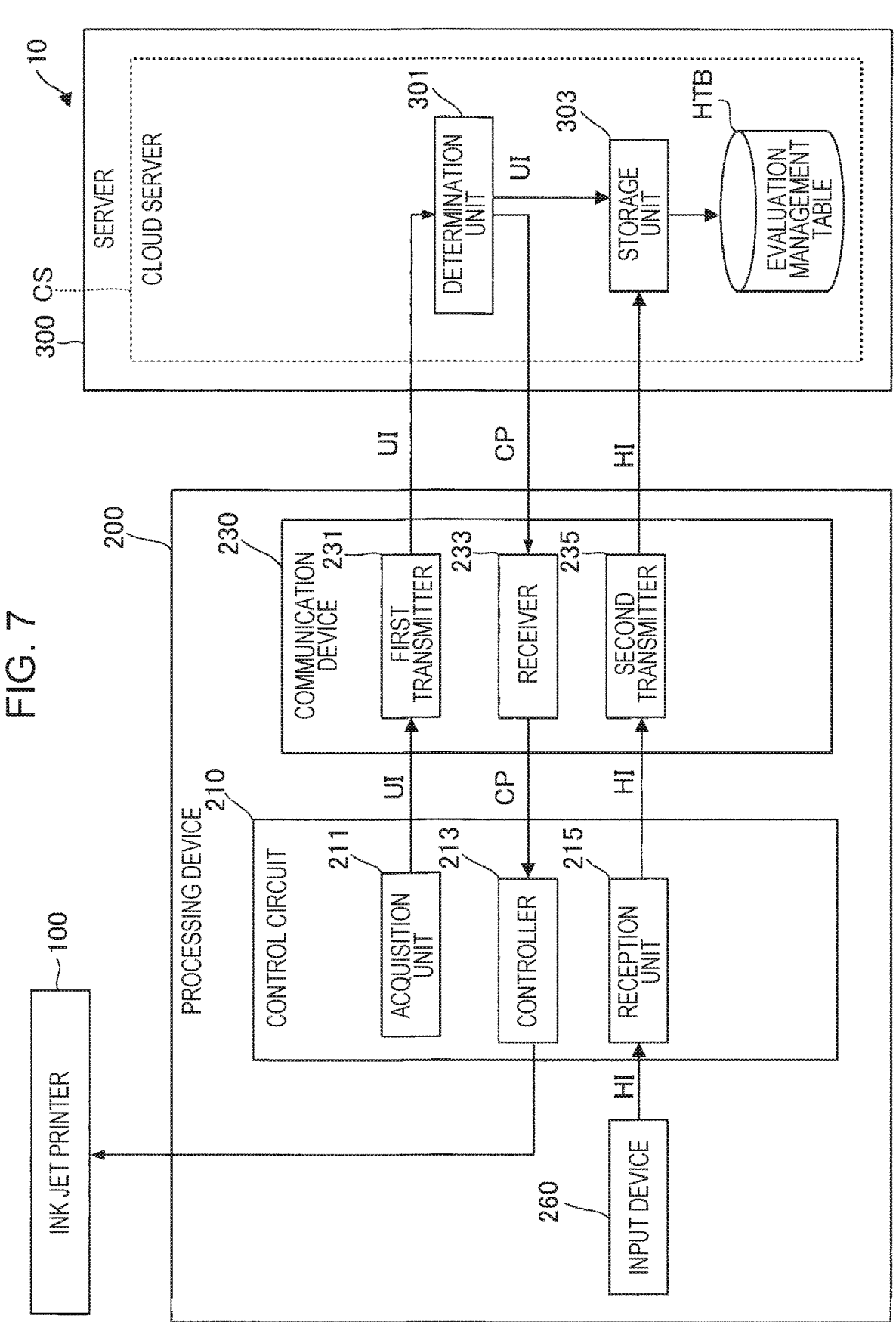
FIG. 7 is a diagram showing the functions of the ink jet system.

FIG. 7 is a diagram showing the functions of the ink jet system 10. The control circuit 210 functions as an acquisition unit 211, a controller 213, and a reception unit 215 by reading the ink jet program PM2 and executing the read ink jet program PM2. The communication device 230 also functions as a first transmitter 231, a receiver 233, and a second transmitter 235. The server 300 functions as the cloud server CS by reading the virtualization program VM and executing the read virtualization program VM. The cloud server CS functions as a determination unit 301 and a storage unit 303 by the cloud server CS reading the control program PM1 and executing the control program PM1. The cloud server CS generates an evaluation management table HTB by executing the control program PM1. The evaluation management table HTB is a table that stores the evaluation information HI.

Note that the ink jet printer 100 may include an input device and a display device and function as the acquisition unit 211, the controller 213, and the reception unit 215. Furthermore, in the first embodiment, the processing device 200 is connected to the cloud server CS, but in an aspect, the ink jet printer 100 may be connected to the cloud server CS. In this aspect, the ink jet printer 100 includes the first transmitter 231, the receiver 233, and the second transmitter 235.

Moreover, when the server 300 does not function as the cloud server CS, the server 300 may function as the determination unit 301 and the storage unit 303 by the server 300 executing the control program PM1.

Each functional unit will be described with reference to the flowchart shown in FIG. 8.

Figure 8:
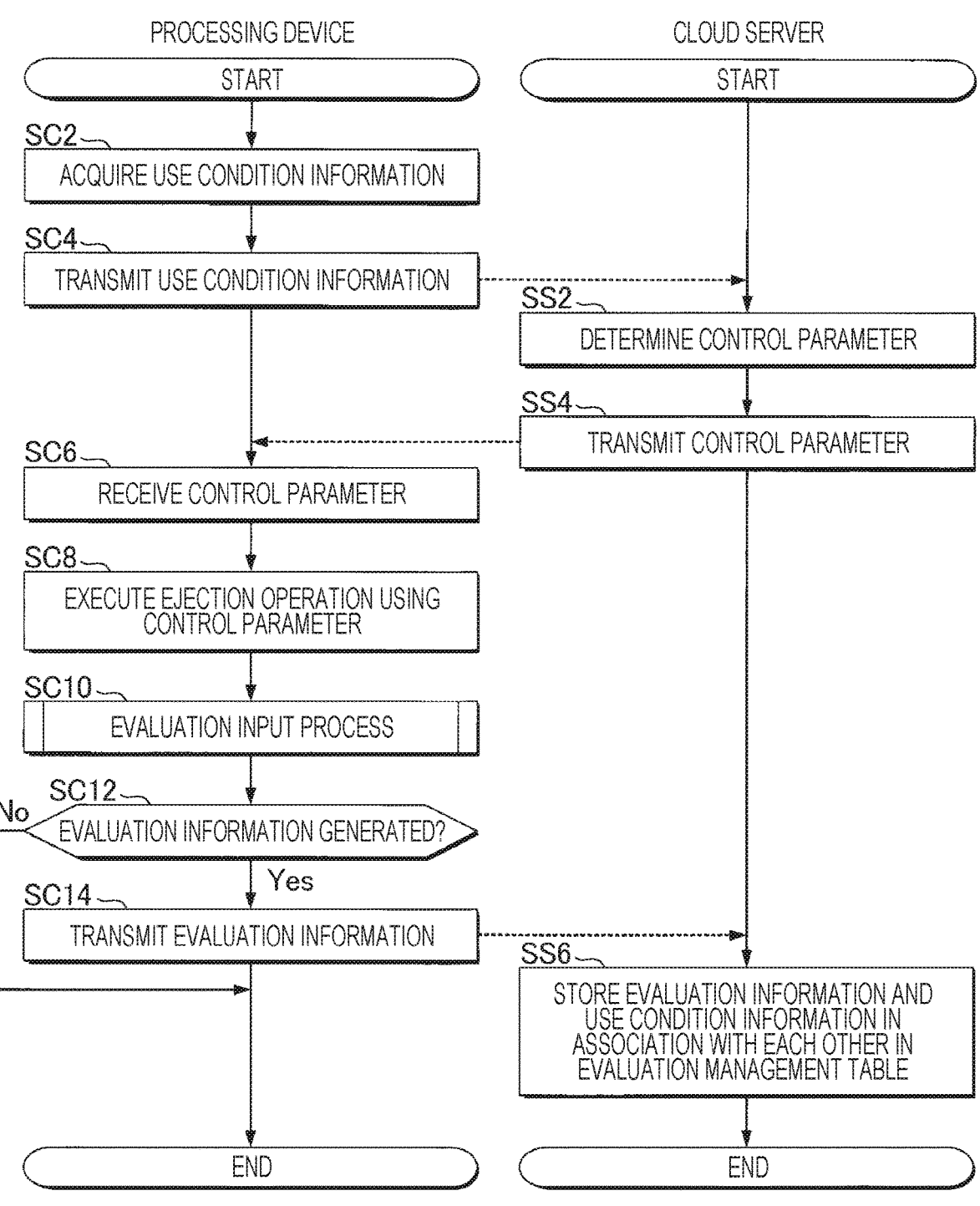
FIG. 8 is a diagram showing a flowchart showing a series of operations of the ink jet system.

FIG. 8 is a flowchart showing a series of operations of the ink jet system 10. A series of operations shown in FIG. 8 are executed, for example, when the user U instructs the processing device 200 to receive the provision of the control parameter CP from the cloud server CS. At step SC2, the control circuit 210 functioning as the acquisition unit 211 acquires the use condition information UI.

The use condition information UI includes one pieces of or a plurality of pieces of information of information about the type of the head unit HU, information about the type of ink, information about the type of the recording medium PP, and information about the temperature in the use environment of the head unit HU. The information about the type of the head unit HU is, for example, a character string indicating the model number of the head unit HU or the identification number of the head unit HU. The information about the type of ink is, for example, information indicating ink characteristics, or a name or model number indicating the type of ink. Information indicating ink characteristics is, for example, viscosity. The information about the type of the recording medium PP is information indicating the characteristics of the recording medium PP or a name indicating the type of the recording medium PP. A characteristic of the recording medium PP is, for example, susceptibility to bleeding. The temperature in the use environment of the head unit HU is the so-called ambient temperature. The ambient temperature can be said to be the temperature of the space in which the ink jet printer 100 on which the head unit HU is mounted is installed, or the temperature around the ink jet printer 100. The information about the ambient temperature is, for example, information indicating the temperature in Celsius of the ambient temperature. Note that the use condition information UI may include information other than the above information instead of or in addition to the above information. For example, the use condition information UI may include information about humidity in the use environment of the head unit HU, information about static surface tension or dynamic surface tension of ink, and information about classification of plain paper, coated paper, vinyl chloride sheet, and the like of the recording medium PP, and the like.

For example, the acquisition unit 211 acquires the use condition information UI by causing the user U to input each piece of information included in the use condition information UI using the input device 260. Alternatively, the acquisition unit 211 may acquire each piece of information included in the use condition information UI from the ink jet printer 100 when it is possible to acquire the information from the ink jet printer 100. For example, when the ink jet printer 100 includes a temperature sensor, the acquisition unit 211 acquires, from the ink jet printer 100, a value indicating the temperature measured by the temperature sensor.

After completing the process of step SC2, under the control of the control circuit 210, the communication device 230 functioning as the first transmitter 231 transmits the use condition information UI to the cloud server CS in step SC4. The processing device 200 waits until there is a response from the cloud server CS.

When receiving the use condition information UI, the cloud server CS functions as the determination unit 301 and determines the control parameter CP according to the use condition information UI in step SS2. An example of the control parameter CP according to the first embodiment will be explained using FIG. 9.

Figure 9:
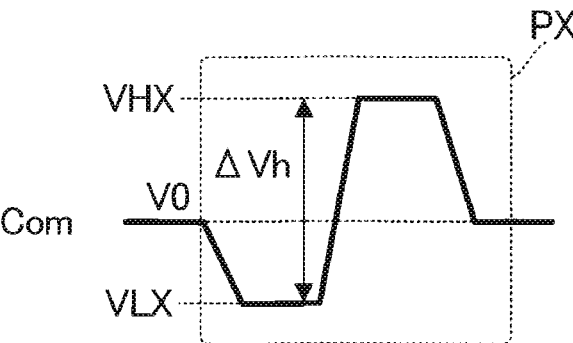
FIG. 9 is a diagram for explaining an example of a control parameter according to the first embodiment.

FIG. 9 is a diagram for explaining an example of the control parameter CP according to the first embodiment. FIG. 9 shows an example of a waveform PX of the drive signal Com. The waveform PX includes a period in which an intermediate potential VO is maintained, a period in which the potential is lowered from the intermediate potential Vo to a lowest potential VLX, a period in which the lowest potential VLX is maintained, and a period in which the potential is raised from the lowest potential VLX to a highest potential VHX, a period in which the highest potential VHX is maintained, and a period in which the potential is lowered from the highest potential VHX to the intermediate potential VO. The ejection amount can be increased as a potential difference $\Delta Vh$ between the lowest potential VLX and the highest potential VHX is increased.

In the first embodiment, the control parameter CP is a parameter regarding the waveform PX that the drive signal Com has. The parameter regarding the waveform PX may be, for example, information indicating the shape of the waveform PX, or information indicating one or both of the lowest potential VLX and highest potential VHX. In the following description, it is assumed that the control parameter CP is information indicating the shape of the waveform PX.

A certain amount of manufacturing error may occur in the head unit HU. Even when a certain predetermined drive signal Com is applied to the head unit HU, the shape of the pressure chamber CV may deviate from the shape assumed by the head manufacturer due to manufacturing errors. As a result, the ejection amount of ink ejected form head unit HU may differ from the predetermined ejection amount specified by the head manufacturer. For example, assume that the information included in the use condition information UI is the identification number of the head unit HU. The cloud server CS stores a table showing the amount of ejection of the head unit HU for each identification number of the head unit HU. From the identification information of the head unit HU included in the use condition information UI, the determination unit 301 refers to the above-described table, and determines information indicating the shape of the waveform PX having the potential difference ΔVh that offsets the manufacturing error as the control parameter CP.

Also, the ejection amount may vary depending on the type of ink. For example, as the viscosity of ink increases, the ejection amount tends to decrease. It is assumed that the information included in the use condition information UI is information indicating the viscosity of ink, and that the viscosity is higher than general viscosity. Based on this premise, the determination unit 301 determines, as the control parameter CP, information indicating the shape of the waveform PX having a potential difference ΔVh larger than the potential difference ΔVh of the waveform PX in the initial state.

In addition, the state after the ink has landed on the recording medium PP may vary depending on the type of the recording medium PP. For example, ink tends to bleed more easily as the thickness of the recording medium PP is thinner. It is assumed that the information included in the use condition information UI is information indicating the characteristics of the recording medium PP, and that the recording medium PP has characteristics that ink tends to bleed. Based on this premise, the determination unit 301 determines, as the control parameter CP, information indicating the shape of the waveform PX having a potential difference ΔVh smaller than the potential difference ΔVh of the waveform PX in the initial state.

Also, the ejection amount may vary depending on the ambient temperature. For example, the lower the ambient temperature is, the thicker the ink is, and as a result of the thicker ink, the ejection amount tends to decrease. It is assumed that the information included in the use condition information UI is information about the ambient temperature and that the temperature indicates a temperature lower than room temperature. Based on this premise, the determination unit 301 determines, as the control parameter CP, information indicating the shape of the waveform PX having a potential difference ΔVh larger than the potential difference ΔVh of the waveform PX in the initial state.

Description returns to FIG. 8. After completing the process of step SS2, the cloud server CS transmits the determined control parameter CP to the processing device 200 in step SS4.

At step SC6, the communication device 230 functioning as the receiver 233 receives the control parameter CP. Next, in step SC8, the control circuit 210 functioning as the controller 213 controls the ejection operation of ejecting ink from the head unit HU using the control parameter CP. Specifically, the control circuit 210 transmits the control parameter CP to the ink jet printer 100. The ink jet printer 100 applies the waveform PX indicated by the control parameter CP to the drive element 111f.

After completing the process of step SC8, the control circuit 210 executes an evaluation input process. The evaluation input process will be described with reference to FIG. 10.

Figure 10:
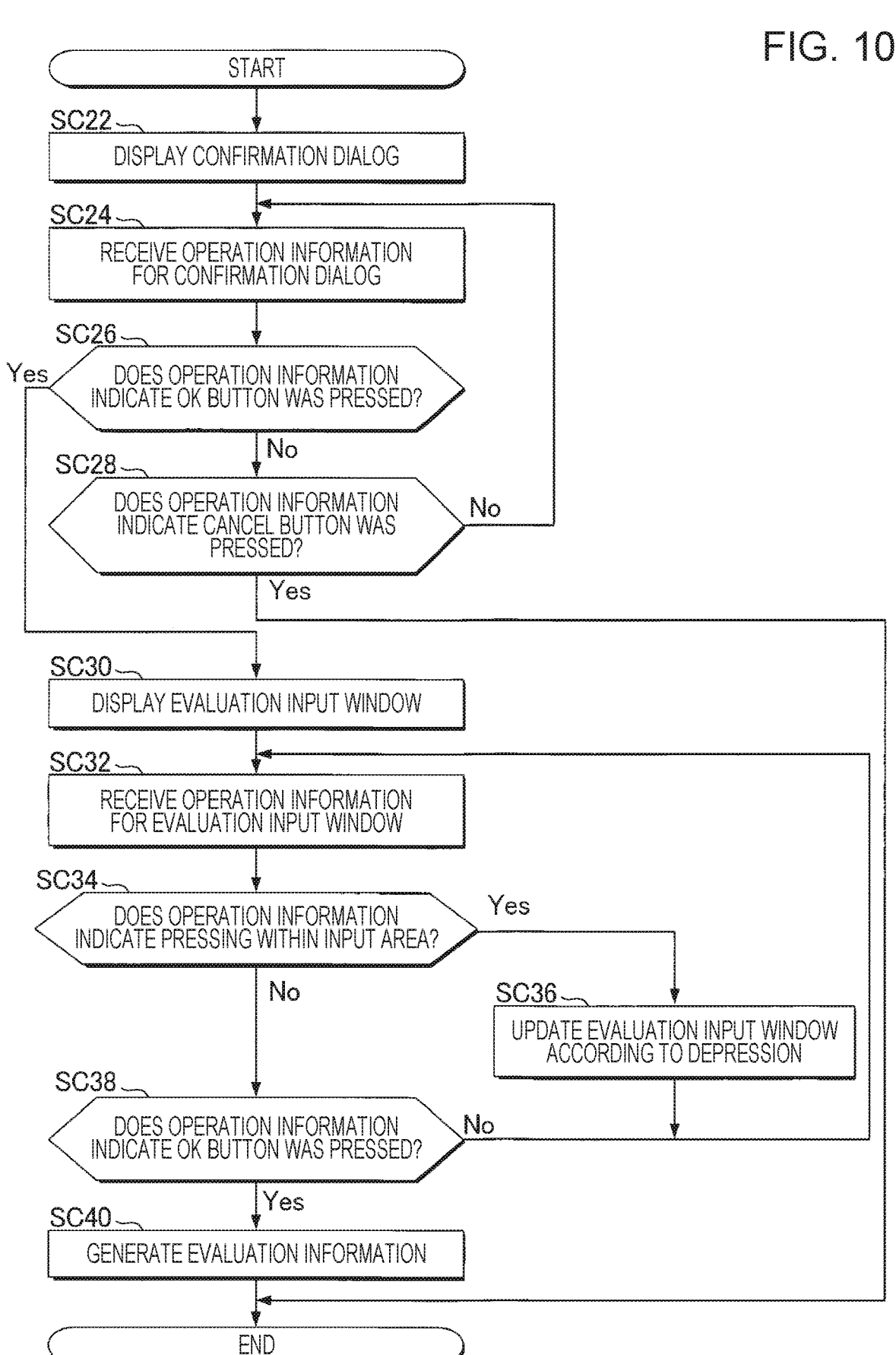
FIG. 10 is a diagram showing a flowchart showing an example of an evaluation input process.

FIG. 10 is a flowchart showing an example of the evaluation input process. The evaluation input process is a process for causing the user U to input the evaluation information HI. At step SC22, control circuit 210 displays a confirmation dialog CD on the display device 270. The confirmation dialog CD will be described with reference to FIG. 11.

Figure 11:
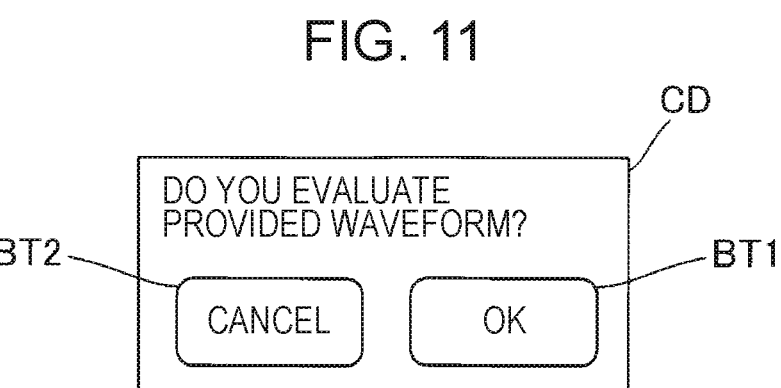
FIG. 11 is a diagram showing an example of a confirmation dialog.

FIG. 11 is a diagram showing an example of the confirmation dialog CD. The confirmation dialog CD is an image for causing the user U to select whether to evaluate the control parameter CP. The confirmation dialog CD has a character string "DO YOU EVALUATE THE PROVIDED WAVEFORM?", an OK button BT1, and a cancel button BT2. Note that the confirmation dialog CD is an example of a "selection image".

After completing the process of step SC22, the control circuit 210 receives operation information for the confirmation dialog CD in step SC24. After completing the process of step SC24, the control circuit 210 determines in step SC26 whether the operation information indicates that the OK button BT1 was pressed. When the determination result in step SC26 is negative, the control circuit 210 determines in step SC28 whether the operation information indicates that the cancel button BT2 was pressed. When the determination result of step SC28 is negative, the control circuit 210 returns the process to step SC24. When the determination result of step SC28 is negative, the control circuit 210 ends the series of processes shown in FIG. 11.

When the determination result of step SC26 is affirmative, the control circuit 210 display an evaluation input window HW in step SC30. The evaluation input window HW will be described with reference to FIG. 12.

Figure 12:
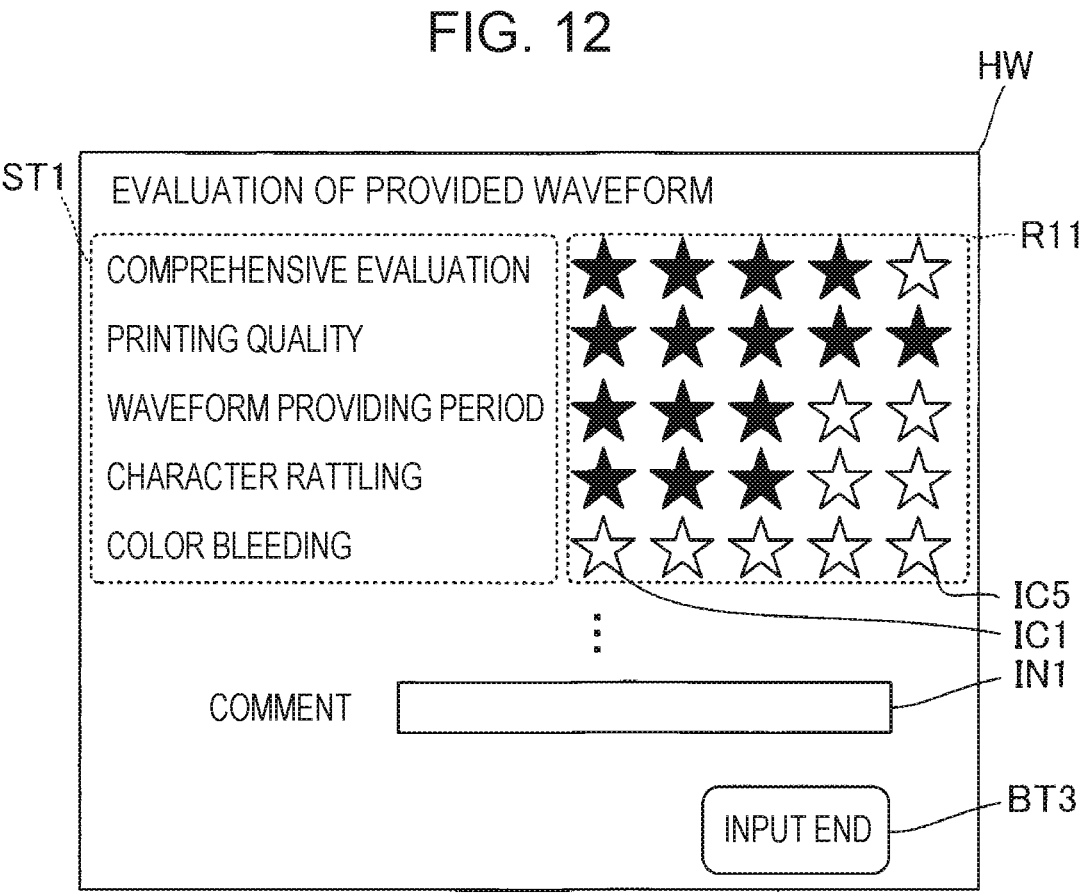
FIG. 12 is a diagram showing an example of an evaluation input window.

FIG. 12 is a diagram showing an example of the evaluation input window HW. The evaluation input window HW has a character string ST1 indicating a plurality of evaluation items, an input region R11 for individually inputting the evaluation result for each of the plurality of evaluation items, an input field IN1 for inputting a comment, and an input end button BT3. FIG. 12 shows five evaluation items as examples of a plurality of evaluation items. However, the number of evaluation items may be one. The five evaluation items shown in FIG. 12 include comprehensive evaluation, printing quality, waveform providing period, character rattling, and color bleeding. The comprehensive evaluation is a comprehensive evaluation regarding the ejection operation. The printing quality is the quality of the image formed on the recording medium PP. The waveform providing period is a period from when the user U instructs the processing device 200 to receive the provision of the control parameter CP to when the ejection operation is completed. The character rattling is rattling of outlines of characters when the image formed on the recording medium PP includes the characters. The color bleeding is color bleeding of an image formed on the recording medium PP. Any one of the plurality of evaluation items is an example of a "first evaluation item", and an evaluation item different from the one evaluation item is an example of a "second evaluation item".

However, the evaluation items are not limited to the items described above. For example, the evaluation item may be one or more of a degree of graininess, a degree of banding, brightness, saturation, a degree of redness, a degree of bluishness, and a degree of greenness instead of or in addition to the plurality of items described above. The banding is a streak that occurs when partial images corresponding to adjacent passes are formed.

The input region R11 is a region where the user U operates the input device 260 to input the evaluation result for each of a plurality of evaluation items. In the example of FIG. 12, it is possible to perform evaluation on each of a plurality of evaluation items in five levels. In the example of FIG. 12, the number of levels of evaluation is 5, but it is not limited to 5 as long as it is 3 or larger. Five levels are an example of "N levels of three or more".

In the input region R11, five asterisk icons are displayed for each of a plurality of evaluation items, and the larger the number of blackened icons, the higher the evaluation. In the example of FIG. 12, the comprehensive evaluation indicates the evaluation next to the highest evaluation in five levels, the printing quality indicates the highest evaluation in five level, and the waveform providing period and the character rattling indicate the third evaluation in five levels. For example, when the user U presses an icon IC1 with a mouse, which is an example of the input device 260, the icon IC1 is blacked out, and the color bleeding indicates the lowest evaluation in five level. On the other hand, for example, when the user U presses an icon IC5 with the mouse, the five icons from the icon IC1 to the icon IC5 are blacked out, and the color bleeding indicates the highest evaluation in five level. An any character string related to the waveform provided is entered by the user U in the input field IN1.

After completing the process of step SC30, the control circuit 210 functioning as the reception unit 215 receives operation information for the evaluation input window HW in step SC32. After completing the process of step SC32, the control circuit 210 determines in step SC34 whether the operation information indicates pressing within the input region R11. When the determination result in step SC34 is affirmative, the control circuit 210 updates the evaluation input window HW in response to the depression in step SC36. After completing the process of step SC36, the control circuit 210 returns the process to step SC32.

When the determination result in step SC34 is negative, the control circuit 210 determines in step SC38 whether the operation information indicates that the input end button BT3 was pressed. When the determination result of step SC38 is negative, the control circuit 210 returns the process to step SC32.

When the determination result of step SC38 is affirmative, the control circuit 210 generates the evaluation information HI indicating the evaluation result of each of the plurality of evaluation items based on the display content of the evaluation input window HW in step SC40. In the example of FIG. 12, the control circuit 210 generates the evaluation information HI that has a numerical value indicating the evaluation result of the comprehensive evaluation, a numerical value indicating the evaluation result of the printing quality, a numerical value indicating the evaluation result of the waveform providing period, a numerical value indicating the evaluation result of the character rattling, and a numerical value indicating the evaluation result of the color bleeding.

After completing the process of step SC40, the control circuit 210 ends the series of processes shown in FIG. 10. Although not shown in the flowchart shown in FIG. 10, when the operation information received in the process of step SC32 indicates character input to the input field IN1, the control circuit 210 causes the entered character string to appear in the input field IN1.

However, the evaluation input process is not limited to the example in FIG. 10. For example, the control circuit 210 may execute the process from step SC30 without executing the series of processes from step SC22 to step SC28. In other words, the processing device 200 may display the evaluation input window HW at any time without displaying the confirmation dialog CD.

Description returns to FIG. 8. After completing the process of step SC10, the control circuit 210 determines in step SC12 whether the evaluation information HI is generated by executing the evaluation input process. Specifically, when the process of step SC40 is executed in the evaluation input process, it is determined that the determination result of step SC12 is affirmative, and when it is determined that the determination result of step SC28 is affirmative in the evaluation input process, it is determined that the determination result of step SC12 is negative.

When the determination result of step SC12 is affirmative, the communication device 230 functioning as the second transmitter 235 transmits the evaluation information HI to the cloud server CS in step SC14 under the control of the control circuit 210. When the determination result of step SC12 is negative, or after the process of step SC14 is completed, the processing device 200 ends the series of processes shown in FIG. 8.

When the ink jet printer 100 receives the evaluation information HI, the cloud server CS functions as the storage unit 303 and stores the evaluation information HI and the use condition information UI in association with each other in the evaluation management table HTB in step SS6. For example, the evaluation management table HTB stores a record that associates one piece of the evaluation information HI with one piece of the use condition information UI. Also, the evaluation management table HTB may store the evaluation information HI, the use condition information UI, and the control parameter CP with the evaluation information HI in association with the use condition information UI, and the control parameter CP in the evaluation management table HTB. Alternatively, the cloud server CS may store only the evaluation information HI in the evaluation management table HTB. After completing the process of step SS6, the cloud server CS ends the series of processes shown in FIG. 8.

1-7. Summary of First Embodiment

As described above, the ink jet system 10 according to the first embodiment includes the ink jet printer 100 on which a head unit UI that ejects ink is mounted and that performs recording on the recording medium PP, the processing device 200 that is connected to the ink jet printer 100 and performs a data process for causing the ink jet printer 100 to perform recording, and the cloud server CS connectable to either the ink jet printer 100 or the processing device 200, wherein either the ink jet printer 100 or the processing device 200 includes the receiver 233 that receives the control parameter CP from the cloud server CS, the controller 213 that controls an ejection operation of ejecting ink from the head unit HU based on the control parameter CP, and the reception unit 215 that receives the evaluation information HI indicating an evaluation result obtained by causing the user U to perform evaluation on the evaluation item of the control parameter CP in N levels of three or more after the ejection operation. According to the ink jet system

10 according to the first embodiment, the processing device 200 receives the evaluation information HI obtained by causing the user U to perform evaluation in N levels of three or more, so that the head manufacturer can obtain knowledge about to what extent control parameter CP provided last time should be changed.

Either the ink jet printer 100 or the processing device 200 further includes the first transmitter 231 that transmits the use condition information UI related to the use condition of the head unit HU to the cloud server CS, wherein the cloud server CS determines the control parameter CP according to the use condition information UI transmitted from the first transmitter 231 to transmit the control parameter CP to the receiver 233. According to the ink jet system 10 according to the first embodiment, the processing device 200 determines the control parameter CP according to the use condition information UI, so that it is possible to determine the control parameter CP according to the use condition of the head unit HU.

The use condition information UI includes information about the type of the head unit HU. As described above, a certain degree of manufacturing error may occur in the head unit HU. For example, when the use condition information UI includes the identification number of the head unit HU, the cloud server CS can determine the control parameter CP that offsets the manufacturing error of the head unit HU using the use condition information UI. In addition, ejection characteristics such as an ejection amount and an ejection speed may vary depending on the type of the head unit HU. Therefore, when the use condition information UI includes a character string indicating the model number of the head unit HU, the cloud server CS can determine the control parameter CP that can offset the difference in ejection characteristics depending on the type of the head unit HU using the use condition information UI.

The use condition information UI includes information about the type of ink ejected by the head unit HU. As described above, the amount of ink ejected may vary depending on the type of ink. Since the use condition information UI includes the information about the type of ink, the cloud server CS can determine the control parameter CP that offsets the fluctuation in the ejection amount according to the type of ink.

The use condition information UI includes information about the type of the recording medium PP. As described above, the state of ink after the ink has landed on the recording medium PP may vary depending on the type of the recording medium PP. Since the use condition information UI includes information about the type of the recording medium PP, the cloud server CS can determine the control parameter CP that offsets the fluctuation in the state of the ink according to the type of the recording medium PP.

The use condition information UI includes information about the ambient temperature. As described above, the amount of ink ejected may vary depending on the ambient temperature. By including information about the ambient temperature in the use condition information UI, the cloud server CS can determine the control parameter CP that offsets the fluctuation in the amount of ink ejected according to the ambient temperature.

The head unit HU includes the drive element 111*f* that is a piezoelectric element, and the control parameter CP is a parameter related to the drive signal Com applied to the drive element 111*f*. According to the ink jet system 10 according to the first embodiment, the cloud server CS transmits the parameter regarding the waveform PX to the recording system 20, so that the recording system 20 can execute the ejection operation according to the use condition of the head unit HU.

Either the ink jet printer 100 or the processing device 200 further includes the second transmitter 235 that transmits the evaluation information HI received by the reception unit 215 to the cloud server CS. By the second transmitter 235 transmitting the evaluation information HI to the cloud server CS, the head manufacturer can provide the appropriate control parameter CP from the next time onward based on the transmitted evaluation information HI. There are two aspects for providing the appropriate control parameter CP from the next time onward. In the first aspect, the cloud server CS determines the control parameter CP based on the evaluation information HI when the cloud server CS receives the use condition information UI next time. In the second aspect, the head manufacturer updates the control program PM1 stored in the server 300 by referring to the evaluation information HI. By updating the control program PM1, the cloud server CS can provide the appropriate control parameter CP from the next time onward. Furthermore, by storing the evaluation information HI in the evaluation management table HTB and the use condition information UI in association with each other as in the present embodiment, the head manufacturer can reproduce the use condition of the head unit HU of the user U based on the use condition information UI, for example, when focusing on the obtained evaluation information HI.

Also, the evaluation items of the control parameter CP include at least a first evaluation item and a second evaluation item different from each other, and the evaluation information HI indicates the evaluation result obtained by causing the user U to individually perform evaluation on each of the first evaluation item and the second evaluation item of the control parameter CP in N levels. By causing the user U to perform evaluation on a plurality of evaluation items individually, the head manufacturer can provide the appropriate control parameter CP from the next time onward according to each of the plurality of evaluation items. For example, when the printing quality indicates the lowest evaluation in five levels, the head manufacturer improves the ejection amount, the ejection speed, and the like. Also, when the waveform providing period indicates the lowest evaluation in five levels, the head manufacturer speeds up the operation of the control program PM1, for example.

Further, the ink jet system 10 further includes the display device 270 that displays the confirmation dialog CD for causing the user U to select whether to evaluate the control parameter CP after the ejection operation, wherein the reception unit 215 further receives the evaluation information HI when receiving information indicating that the user U evaluates the control parameter CP as a result of the operation by the user U according to the confirmation dialog CD, and does not receive the evaluation information HI when receiving information indicating that the user U does not evaluate the control parameter CP as a result of the operation by user U according to the confirmation dialog CD. By displaying the evaluation input window HW without displaying the confirmation dialog CD, it is possible to omit selecting whether to perform evaluation. In this aspect, it is possible to improve convenience for the user U, for example, when the user U is in a hurry, compared with an aspect of displaying the evaluation input window HW after displaying the confirmation dialog CD.

2. Modifications

Each form illustrated above can be variously modified. Specific modifications are exemplified below. Two or more aspects optionally selected from the following exemplifications can be appropriately merged within a range not inconsistent with each other.

2-1. First Modification

As described above, the control parameter CP may be a parameter related to the image process. The parameter related to the image process in the control parameter CP is, for example, part or all of a lookup table used in a color conversion process included in the image process, a portion or all of a dither pattern used in a RIP process included in the image process, or part or all of the error diffusion matrix used in a RIP process included in the image process. The first modification will be described below assuming that the parameter related to the image process is a lookup table.

FIG. 13 is a diagram for explaining an example of the control parameter CP according to the first modification. FIG. 13 shows a lookup table LT1 that is the initial values of the ink jet program PM2 and a lookup table LT2 that is the control parameter CP according to the first modification. The difference between the lookup table LT1 and the lookup table LT2 is that the CMY values of (R, G, B)=(0, 0, 128) are converted from (C, M, Y)=(128, 128, 0) into (C, M, Y)=(172, 64, 0).

By changing the lookup table, the ink jet system 10 according to the first modification can perform an ejection operations according to the use condition of the head unit HU, as in the first embodiment. For example, when the ejection amount is reduced depending on the use condition of the head unit HU, one or more of the CMY values may be increased. For example, it is assumed that the information included in the use condition information UI is information indicating the viscosity of ink, and that the viscosity is higher than general viscosity. Based on this premise, the determination unit 301 determines the lookup table so that one or more of the CMY values are increased. Even when the information included in the use condition information UI is any one piece of or more pieces of the information about the type of the head unit HU, the information about the type of the recording medium PP, and the information about the temperature, the same applies as in the information about the type of ink.

For the series of operations of the ink jet system 10 according to the first modification, in step SC6, the control circuit 210 receives the lookup table LT2, which is the control parameter CP according to the first modification, and overwrites the lookup table LT1 stored in the storage circuit 220 with the lookup table LT2.

As described above, in the ink jet system 10 according to the first modification, the processing device 200 generates the recording data DP used for recording by executing an image process on image data as a data process, and the control parameter CP is a parameter related to the image process. According to the ink jet system 10 according to the second embodiment, the cloud server CS transmits the parameter regarding the image process to the recording system 20, so that the recording system 20 can execute the ejection operation according to the use condition of the head unit HU. Compared with the first embodiment, the first modification does not require fine adjustment of the drive signal Com. Therefore, in the ink jet system 10 according to the first modification, the drive element 111f may be a heat generating element. The heat generating element converts electrical energy into thermal energy, generates air bubbles inside the pressure chamber CV by heating, and changes the pressure inside the pressure chamber CV.

2-2. Second Modification

In each aspect described above, the evaluation input window HW is not limited to the aspect shown in FIG. 12. An evaluation input window HW-A according to the second modification will be explained using FIG. 14.

Figure 14:
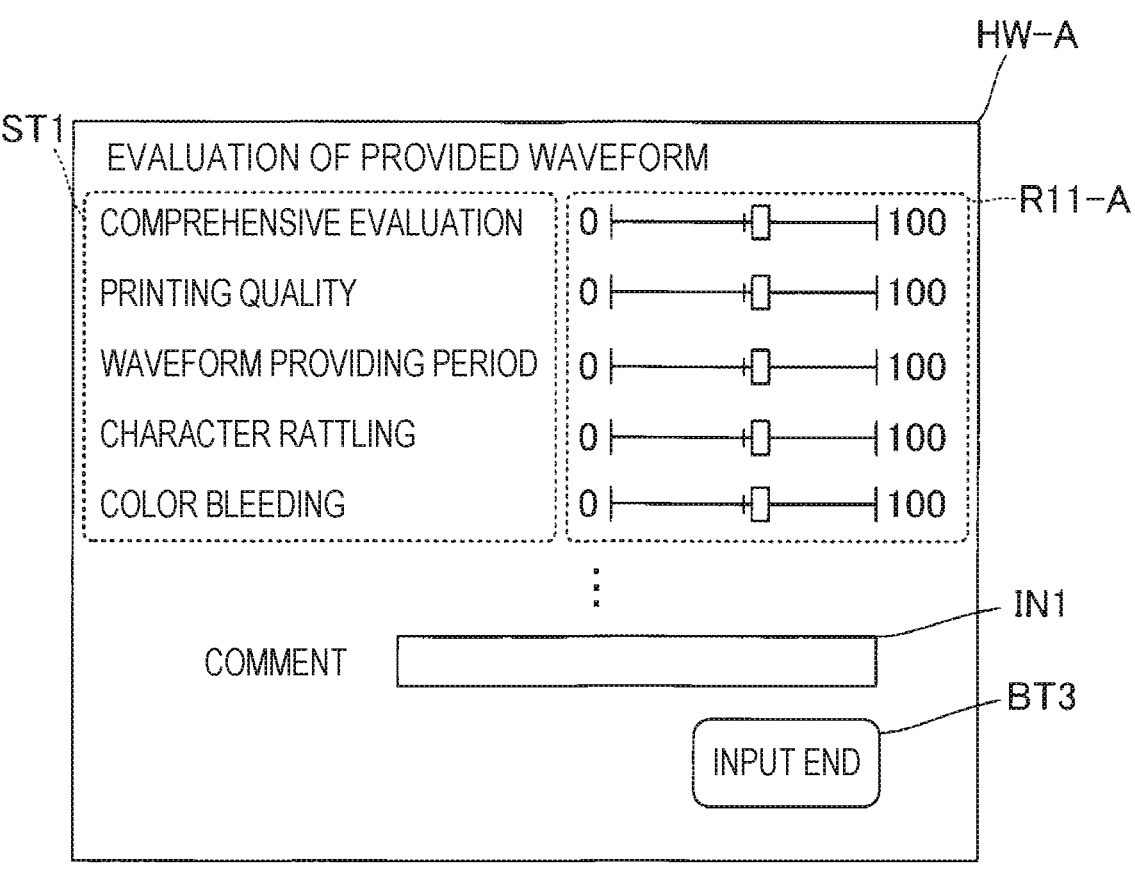
FIG. 14 is a diagram showing an example of an evaluation input window according to a second modification.

FIG. 14 is a diagram showing an example of the evaluation input window HW-A according to the second modification. The evaluation input window HW-A differs from the evaluation input window HW in that it has an input region R11-A instead of the input region R11.

In the input region R11-A, a slider bar is displayed for each of a plurality of evaluation items, and the bar positioned further to the right indicates a higher evaluation. The user U moves the bar with the mouse.

2-3. Third Modification

In each aspect described above, the reception unit 215 receives the evaluation information HI obtained by causing the user U to perform evaluation in N levels of three or more, but the present disclosure is not limited to this. For example, the reception unit 215 receives the evaluation information HI indicating the evaluation result obtained by causing the user U to individually perform evaluation on a plurality of evaluation items including at least the first evaluation item and the second evaluation item different from each other. The evaluation result obtained by causing the user U to perform evaluation may be an evaluation result evaluated in two levels, or may be a character string indicating the user U's evaluation for the evaluation result. For example, a character string indicating the user U's evaluation for character rattling is "there is vertical rattling".

As described above, the ink jet system 10 according to the third modification includes the ink jet printer 100 on which a head unit UI that ejects ink is mounted and that performs recording on the recording medium PP, the processing device 200 that is connected to the ink jet printer 100 and performs a data process for causing the ink jet printer 100 to perform recording, and the cloud server CS connectable to either the ink jet printer 100 or the processing device 200, wherein either the ink jet printer 100 or the processing device 200 includes the receiver 233 that receives the control parameter CP from the cloud server CS, the controller 213 that controls an ejection operation of ejecting ink from the head unit HU based on the control parameter CP, and the reception unit 215 that receives the evaluation information HI indicating an evaluation result obtained by causing the user U to individually perform evaluation on the first evaluation item and the second evaluation item different from each other of the control parameter CP after the ejection operation. According to the ink jet system 10 according to the third modification, by causing the user U to individually perform evaluation on a plurality of evaluation items, the head manufacturer can provide the appropriate control parameter CP corresponding to each of the plurality of evaluation items.

2-4. Fourth Modification

In each aspect described above, when the ink jet printer 100 includes an input device and a display device and functions as the acquisition unit 211, the controller 213, and the reception unit 215, the control circuit 170 functions as the acquisition unit 211, the controller 213, and the reception unit 215, but the present disclosure is not limited to this. For example, when the head unit HU includes a control circuit such as a CPU, this control circuit may function as the acquisition unit 211, the controller 213, and the reception unit 215.

2-5. Fifth Modification

In each aspect described above, when the ink jet printer 100 is connectable to the server 300, the communication device 150 is connected to the server 300, but the present disclosure is not limited to this. For example, when the head unit HU includes a communication device, this communication device may communicate with the server 300.

2-6. Sixth Modification

In each of the aspects described above, the serial ink jet printer 100 in which the head unit HU is reciprocated in the direction along the X axis is exemplified, but the present disclosure is not limited to such aspects. The ink jet printer 100 may be a line-type liquid ejection apparatus in which a plurality of nozzles Nz is distributed over the entire width of the recording medium PP.

2-7. Other Modifications

The ink jet printer 100 described above can be employed in various devices such as a facsimile machine and a copier, in addition to a device dedicated to printing. Further, the application of the recording device of the present disclosure is not limited to printing. For example, a recording device that ejects a solution of a color material is used as a manufacturing device that forms a color filter for a liquid crystal display device. Further, a recording device that ejects a solution of a conductive material is used as a manufacturing device that forms wiring on a wiring substrate and electrodes.

What is claimed is:

1. An ink jet system comprising:
a recording device on which a head unit that ejects ink is mounted, the recording device performing recording on a recording medium;
a processing device connected to the recording device and performing a data process for causing the recording device to perform recording; and
a server connectable to either the recording device or the processing device, wherein
either the recording device or the processing device includes
a receiver that receives a control parameter from the server,
a controller that controls an ejection operation for ejecting ink from the head unit based on the control parameter,
a display unit that displays an evaluation input window having a function that a user can perform evaluation on a first evaluation item in N (N is three or more) levels, the first evaluation item being to evaluate the control parameter, and
a reception unit that receives an evaluation result by the user via the evaluation input window after the ejecting operation.

2. The ink jet system according to claim 1, wherein either the recording device or the processing device further includes

24 a first transmitter that transmits use condition information related to a use condition of the head unit to the server, and wherein
the server determines the control parameter according to the use condition information transmitted from the first transmitter to transmit the control parameter to the receiver.

3. The ink jet system according to claim 2, wherein the use condition information includes information about a type of the head unit.

4. The ink jet system according to claim 2, wherein the use condition information includes information about a type of ink ejected by the head unit.

5. The ink jet system according to claim 2, wherein the use condition information includes information about a type of the recording medium.

6. The ink jet system according to claim 2, wherein the use condition information includes information about a temperature in a use environment of the head unit.

7. The ink jet system according to claim 1, wherein the head unit includes a drive element, and wherein the control parameter is a parameter related to a drive signal applied to the drive element.

8. The ink jet system of claim 1, wherein the processing device generates recording data used for recording by executing an image process on image data as the data process, and wherein
the control parameter is a parameter related to the image process.

9. The ink jet system according to claim 1, wherein either the recording device or the processing device further includes
a second transmitter that transmits the evaluation result received by the reception unit to the server.

10. The ink jet system according to claim 1, wherein the evaluation input window further has a function that the user can perform evaluation on a second evaluation item in N (N is three or more) levels, the second evaluation item being to evaluate the control parameter and to differ from the first evaluation item.

11. The ink jet system according to claim 1, wherein comprising:
the display unit further displays a selection image for causing the user to select whether to evaluate the control parameter after the ejection operation, wherein
the reception unit further receives the evaluation result when receiving information indicating that the user evaluates the control parameter as a result of an operation by the user according to the selection image, and
the reception unit does not receive the evaluation result when receiving information indicating that the user does not evaluate the control parameter as a result of an operation by the user according to the selection image.

12. An ink jet system comprising:
a recording device on which a head unit that ejects ink is mounted, the recording device performing recording on a recording medium;
a processing device connected to the recording device and performing a data process for causing the recording device to perform recording; and
a server connectable to either the recording device or the processing device, wherein
either the recording device or the processing device includes
a receiver that receives a control parameter from the server, a controller that controls an ejection operation for ejecting ink from the head unit based on the control parameter, a display unit that displays an evaluation input window having a function that user can perform evaluation on a first evaluation item and second evaluation item individually, the first evaluation item being to evaluate the control parameter, and the second evaluation item being to evaluate the control parameter and to differ from the first evaluation item, and a reception unit that receives an evaluation result by the user via the evaluation input window after the ejection operation.

13. The ink jet system according to claim 12, wherein either the recording device or the processing device further includes a first transmitter that transmits use condition information related to a use condition of the head unit to the server, wherein the server determines the control parameter according to the use condition information transmitted from the first transmitter to transmit the control parameter to the receiver.

14. The ink jet system according to claim 13, wherein the use condition information includes information about a type of the head unit.

15. The ink jet system according to claim 13, wherein the use condition information includes information about a type of ink ejected by the head unit.

16. The ink jet system according to claim 13, wherein the use condition information includes information about a type of the recording medium.

17. The ink jet system according to claim 13, wherein the use condition information includes information about a temperature in a use environment of the head unit.

18. The ink jet system according to claim 12, wherein the head unit includes a drive element, and wherein the control parameter is a parameter related to a drive signal applied to the drive element.

19. The ink jet system of claim 12, wherein the processing device generates recording data used for recording by executing an image process on image data as the data process, and wherein the control parameter is a parameter related to the image process.

20. The ink jet system according to claim 12, wherein either the recording device or the processing device further includes a second transmitter that transmits the evaluation result received by the reception unit to the server.

* * * * *